US011249469B2

(12) United States Patent
SayyarRodsari et al.

(10) Patent No.: US 11,249,469 B2
(45) Date of Patent: Feb. 15, 2022

(54) SYSTEMS AND METHODS FOR LOCALLY MODELING A TARGET VARIABLE

(71) Applicant: ROCKWELL AUTOMATION TECHNOLOGIES, INC., Mayfield Heights, OH (US)

(72) Inventors: Bijan SayyarRodsari, Austin, TX (US); Alexander B. Smith, Round Rock, TX (US); Kadir Liano, Pflugerville, TX (US); Wei Dai, Austin, TX (US); Yash P. Puranik, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 727 days.

(21) Appl. No.: 16/146,647

(22) Filed: Sep. 28, 2018

(65) Prior Publication Data

US 2020/0103888 A1    Apr. 2, 2020

(51) Int. Cl.
*G05B 23/02*    (2006.01)
*G05B 19/418*    (2006.01)

(52) U.S. Cl.
CPC ... *G05B 23/0294* (2013.01); *G05B 19/41845* (2013.01); *G05B 23/0254* (2013.01)

(58) Field of Classification Search
CPC .......... G05B 23/0294; G05B 19/41845; G05B 23/0254; G05B 13/04; G05B 17/02; Y02P 90/02; Y02P 90/80
See application file for complete search history.

(56) References Cited

U.S. PATENT DOCUMENTS

| 5,925,089 | A | * | 7/1999 | Fujime | F02D 41/1458 |
| | | | | | 701/106 |
| 5,956,465 | A | * | 9/1999 | Takagi | G05B 19/41815 |
| | | | | | 700/255 |
| 10,860,010 | B2 | * | 12/2020 | Shimakawa | B25J 9/1671 |
| 2009/0089709 | A1 | * | 4/2009 | Baier | G05B 19/409 |
| | | | | | 715/817 |
| 2011/0202488 | A1 | | 8/2011 | Yuan | |

(Continued)

FOREIGN PATENT DOCUMENTS

| EP | 3171239 A1 | 5/2017 |
| EP | 3318976 A1 | 5/2018 |
| JP | 2008217711 A | 9/2008 |

OTHER PUBLICATIONS

Extended European Search Report for Application No. 19199158.7, dated Mar. 6, 2020, 13 pages.

*Primary Examiner* — Mohammad K Islam
(74) *Attorney, Agent, or Firm* — Fletcher Yoder, PC

(57) ABSTRACT

A method for operating an industrial automation system may include receiving, via a first module of a plurality of modules in a control system, a plurality of datasets via at least a portion of the plurality of modules. The plurality datasets may include raw values without context regarding the plurality datasets. The method may then include identifying a subset of the plurality of datasets that influences a value of a target variable by analyzing the data without regard to the context, modeling a behavior of the target variable over time based on the subset of the plurality of datasets, and adjusting one or more operations of an automation device based on the model.

20 Claims, 18 Drawing Sheets

(56) References Cited

U.S. PATENT DOCUMENTS

| | | | |
|---|---|---|---|
| 2011/0276828 A1* | 11/2011 | Tamaki | G05B 23/0254 |
| | | | 714/26 |
| 2014/0074293 A1* | 3/2014 | Orita | B25J 9/1646 |
| | | | 700/261 |
| 2016/0274552 A1* | 9/2016 | Strohmenger | G06Q 10/06 |
| 2016/0285959 A1* | 9/2016 | Vasko | G05B 19/4185 |
| 2017/0031329 A1* | 2/2017 | Inagaki | B25J 9/163 |
| 2019/0086980 A1* | 3/2019 | Tsuda | G05B 19/0426 |
| 2019/0265657 A1* | 8/2019 | Inagaki | G05B 13/0265 |

* cited by examiner

SYSTEMS AND METHODS FOR LOCALLY MODELING A TARGET VARIABLE

CROSS REFERENCE TO RELATED APPLICATIONS

This application is related to U.S. application Ser. No. 16/156,116 entitled "SYSTEMS AND METHODS FOR ENCRYPTING DATA BETWEEN MODULES OF A CONTROL SYSTEM," filed Sep. 28, 2018, U.S. application Ser. No. 16/146,664 entitled "SYSTEMS AND METHODS FOR CONTROLLING INDUSTRIAL DEVICES BASED ON MODELED TARGET VARIABLES," filed Sep. 28, 2018, and U.S. application Ser. No. 16/146,681 entitled "SYSTEMS AND METHODS FOR RETRAINING A MODEL A TARGET VARIABLE IN A TIERED FRAMEWORK," filed Sep. 28, 2018. Each of these related applications are herein incorporated by reference in their entireties.

BACKGROUND

The present disclosure generally relates to control systems and, more particularly, to using control system for monitoring, diagnostics, and/or modeling generation.

Generally, a control system may facilitate performance of an industrial automation process by controlling operation of one or more automation devices. For example, to facilitate performing an industrial automation process, the control system may determine a control action and instruct an automation device (e.g., a rod-pump) to perform the control action. Additionally, the control system may facilitate monitoring performance of the process to determine whether the process is operating as desired. When not operating as desired, the control system may also facilitate performing diagnostics on the process to determine cause of undesired operation.

As complexity (e.g., number of automation devices and/or amount of process data) of a process increases, complexity of monitoring and/or diagnostics may also increase. For example, increasing amount of process data determined from the industrial automation system may increase number of factors to consider when determining whether the process is operating as desired and/or the cause of undesired operation. In other words, monitoring and/or diagnostics for a complex process may be dependent on ability to efficiency process large amounts of data, particularly when performed in real-time or near real-time (e.g., online during operation of the process). As such, it may be desirable to provide improved systems and methods for analyzing the process data acquired from the industrial automation system in real time or near real time to efficiently monitor the performance of the industrial automation system and increase the efficiency in which the industrial automation system operates.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an industrial automation system may include an automation device and a control system communicatively coupled to the automation device. The control system may include a first module of a plurality of modules that may receive a plurality of datasets via at least a portion of the plurality of modules, such that the plurality datasets may include raw values without context regarding the plurality datasets. The first module may then identify a subset of the plurality of datasets that influences a value of a target variable by analyzing the raw values without regard to the context, model a behavior of the target variable over time based on the subset of the plurality of datasets, and adjust one or more operations of the automation device based on the model.

In another embodiment, a method for operating an industrial automation system may include receiving, via a first module of a plurality of modules in a control system, a plurality of datasets via at least a portion of the plurality of modules. The plurality datasets may include raw values without context regarding the plurality datasets. The method may then include identifying a subset of the plurality of datasets that influences a value of a target variable by analyzing the data without regard to the context, modeling a behavior of the target variable over time based on the subset of the plurality of datasets, and adjusting one or more operations of an automation device based on the model.

In yet another embodiment, a non-transitory computer-readable medium may include computer-executable instructions that, when executed, may cause a processor to receive a plurality of datasets via at least a portion of the plurality of modules, such that the plurality datasets may include raw values without context regarding the plurality datasets. The instructions may then cause the processor to identify a subset of the plurality of datasets that influences a value of a target variable by analyzing the data without regard to the context by grouping the plurality of datasets into a plurality of clusters based on a corresponding condition or operational state of the automation device, determining one or more relationships between each dataset in a respective subset of the plurality of datasets in each of the plurality of clusters, and identifying a portion of datasets in each respective subset of the plurality of datasets based on the one or more relationships. The instructions may then cause the processor to generate a directed graph based on the one or more relationships, such that the directed graph is indicative of a plurality of directional relationships between an additional plurality of datasets of the respective subset of the plurality of datasets. The processor may then display the plurality of clusters and the directed graph via an electronic display.

DRAWINGS

These and other features, aspects, and advantages of the present disclosure will become better understood when the following detailed description is read with reference to the accompanying drawings in which like characters represent like parts throughout the drawings, wherein.

Figure 9:
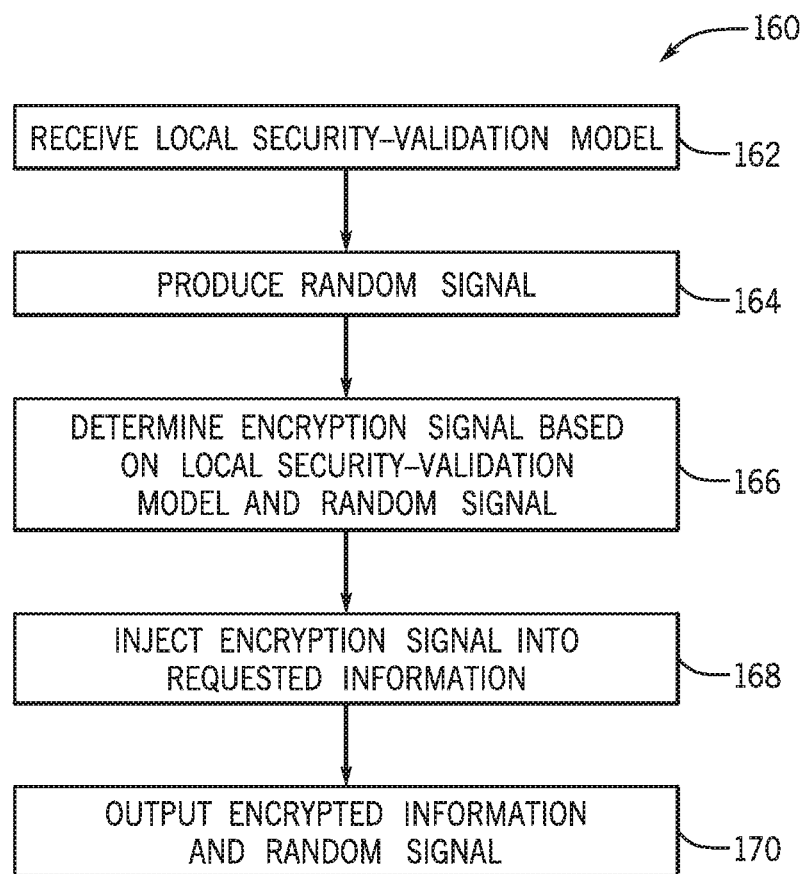
Figure 10:
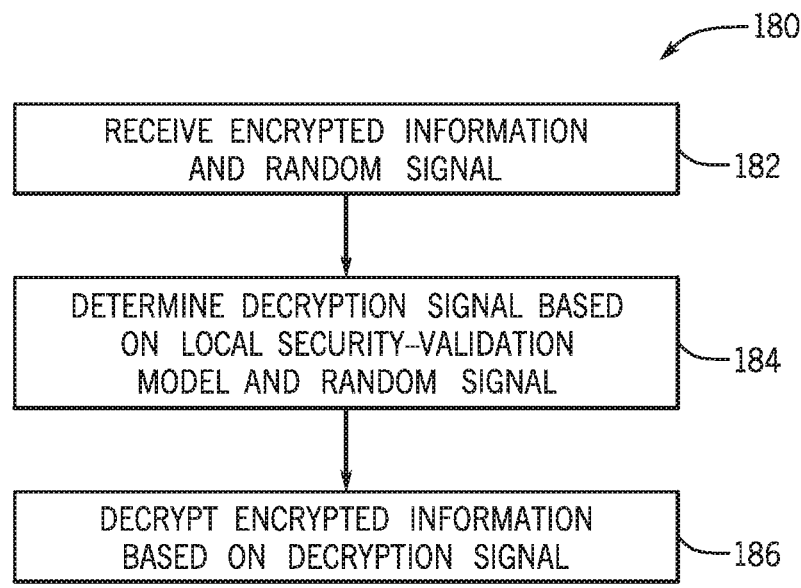
Figure 11:
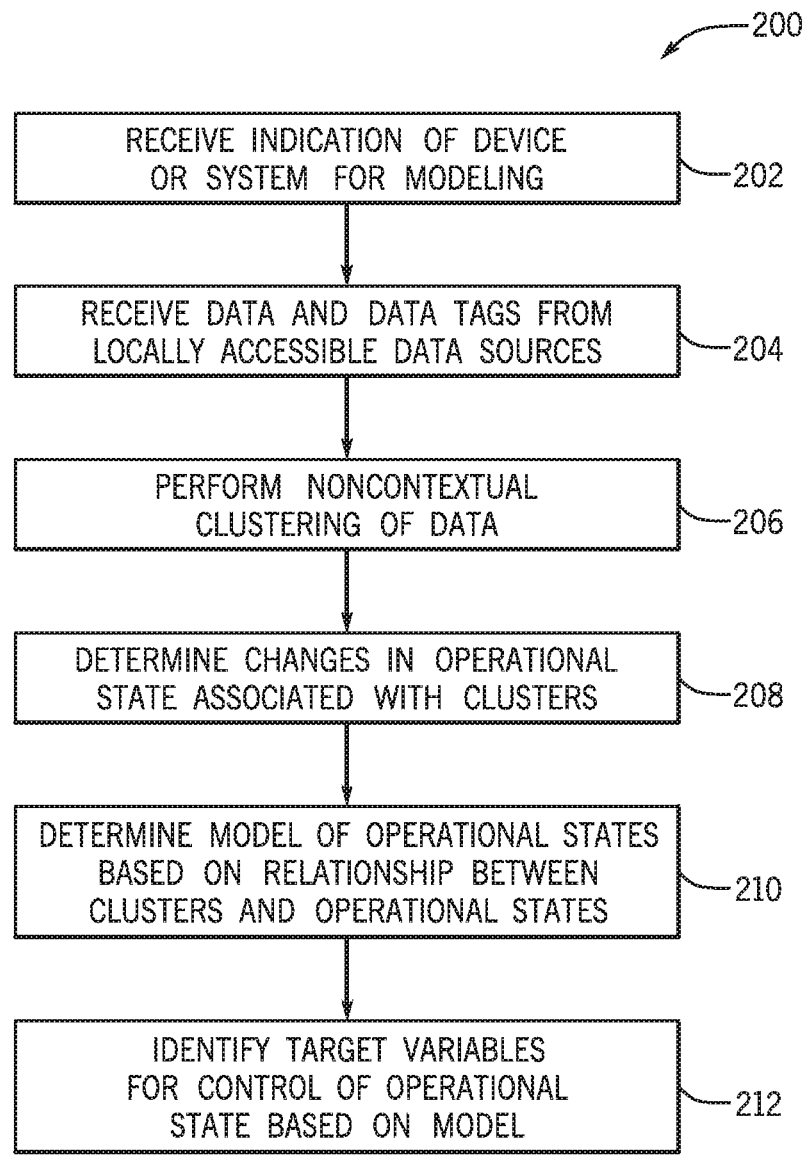
Figure 12:
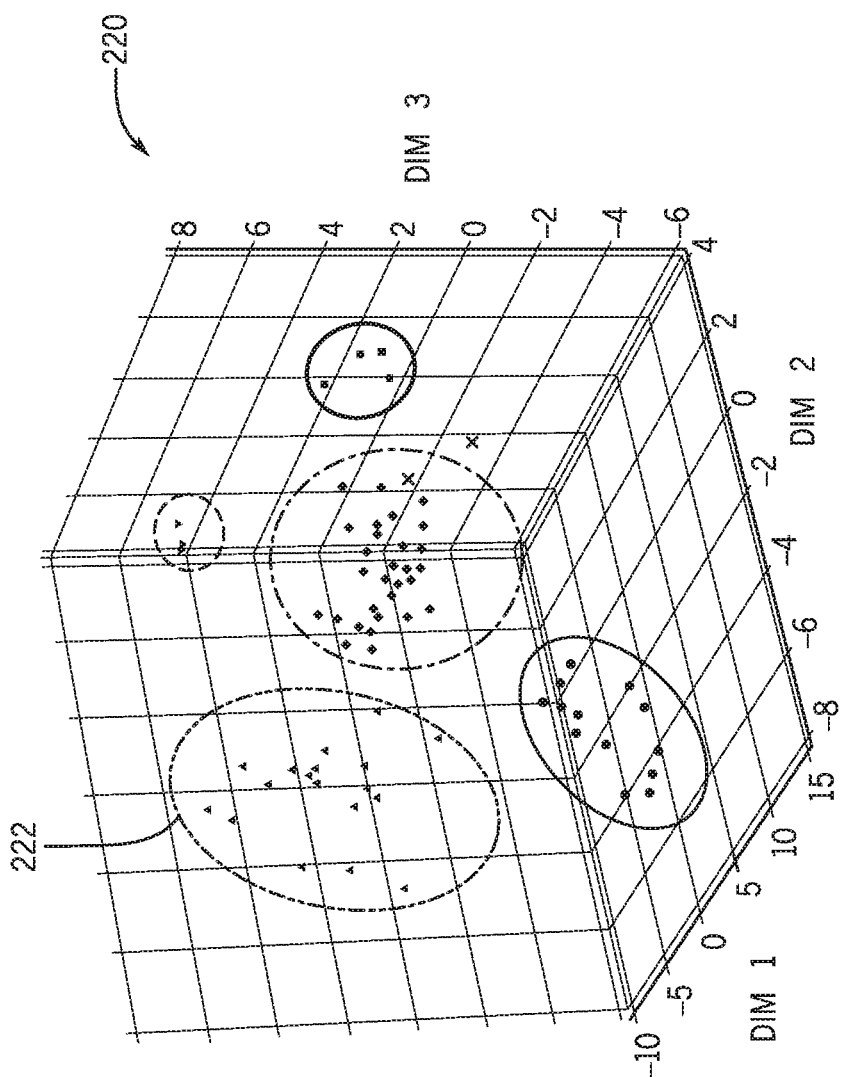
Figure 12:
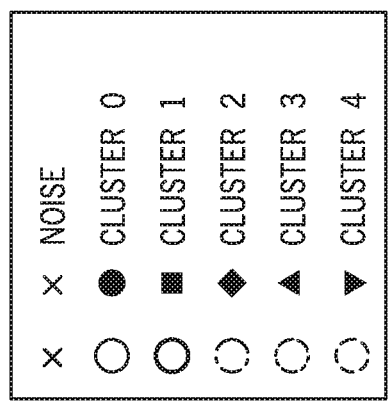
Figure 13:
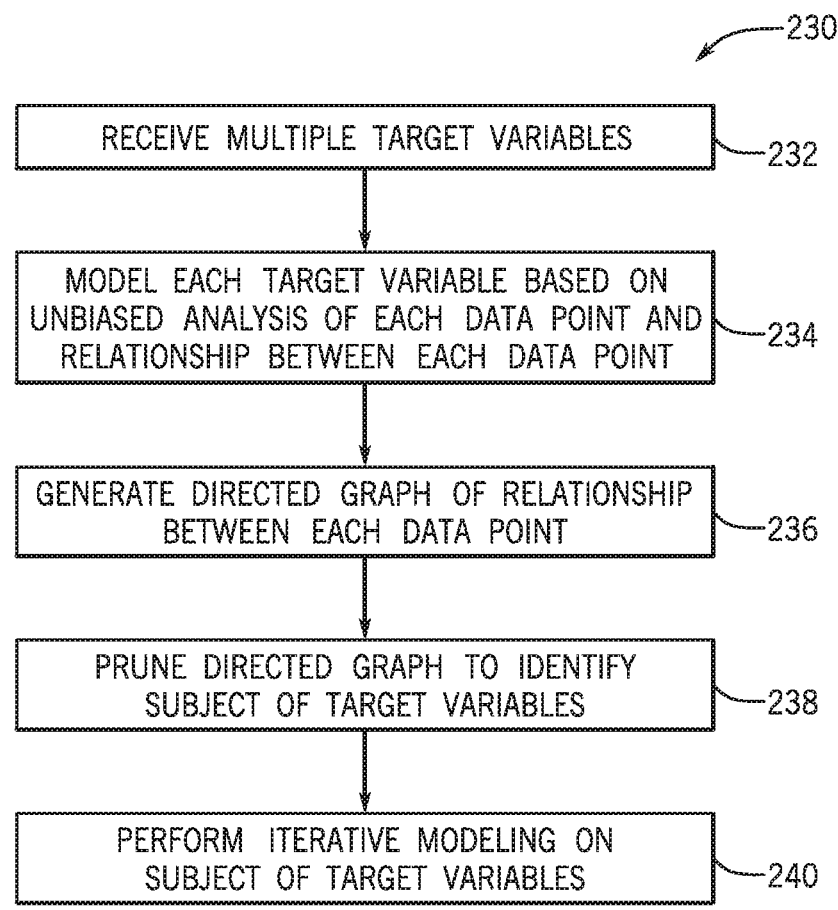
Figure 14:
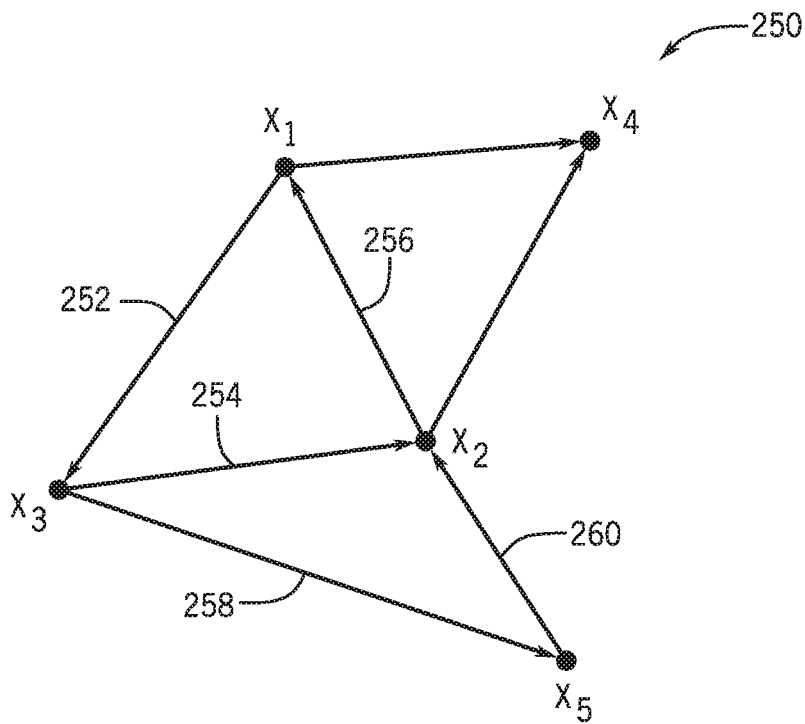
Figure 15:
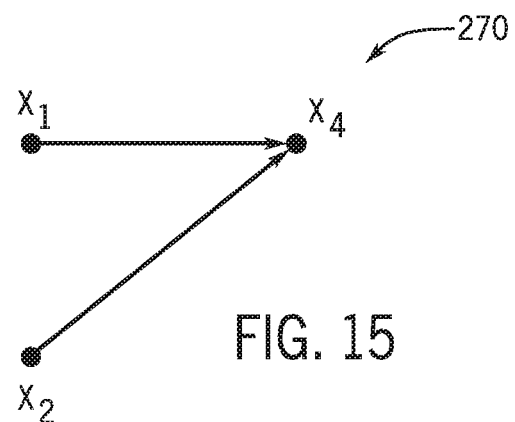
Figure 16:
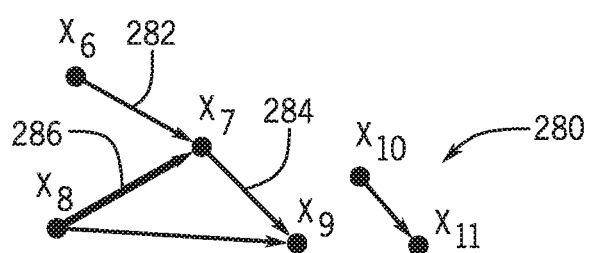
Figure 17:
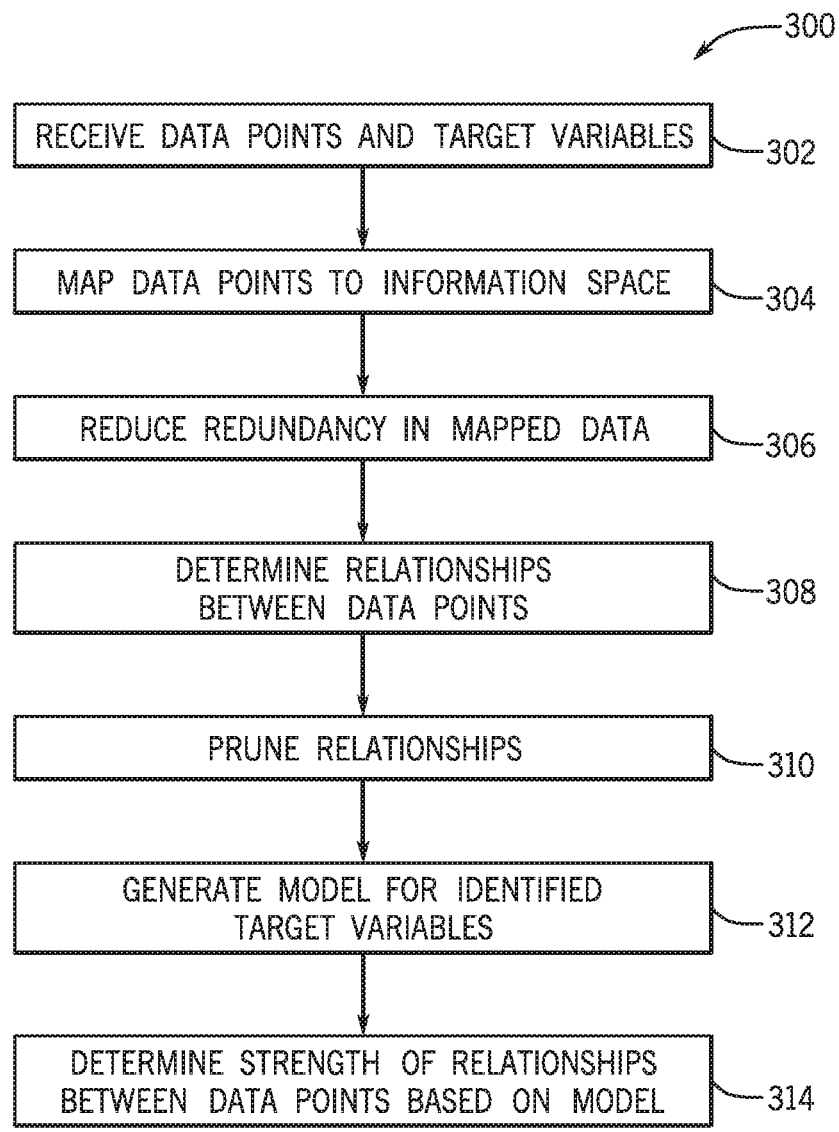
Figure 18:
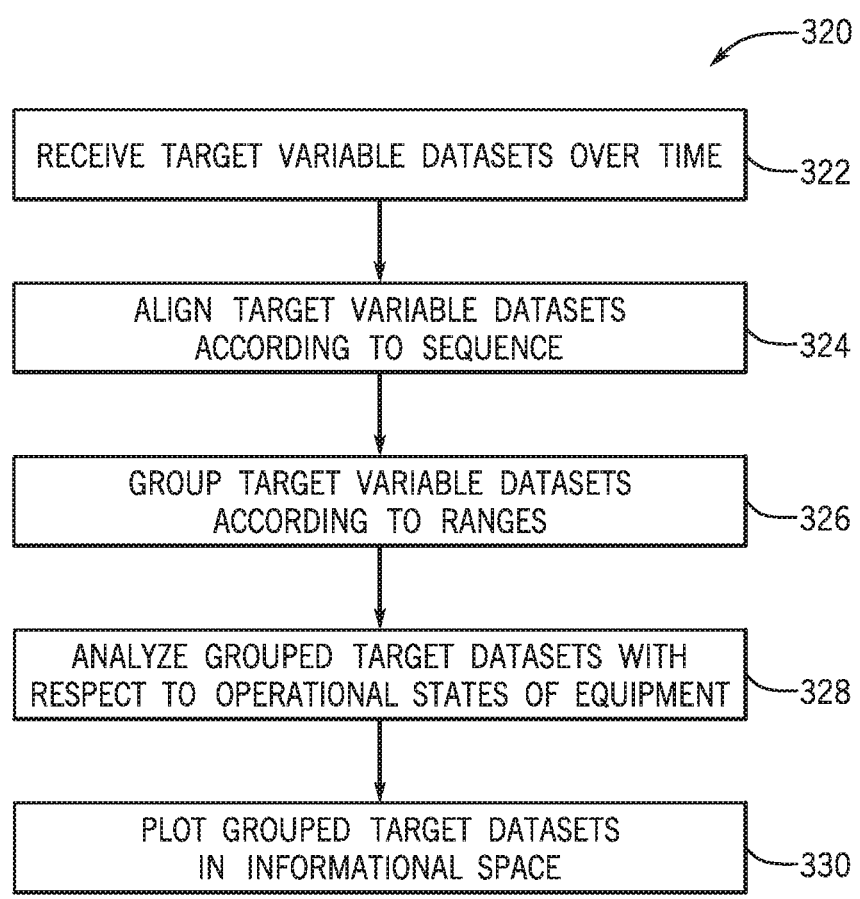
Figure 19:
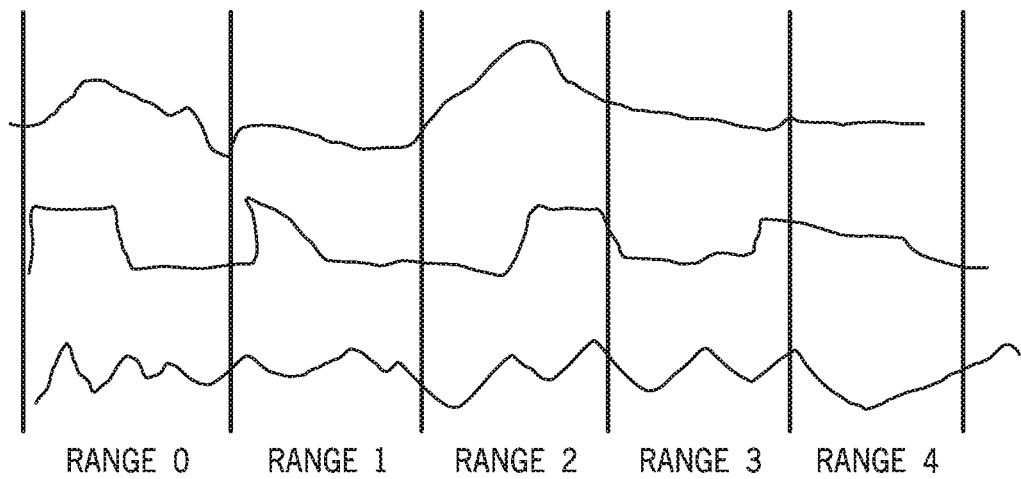
Figure 20:
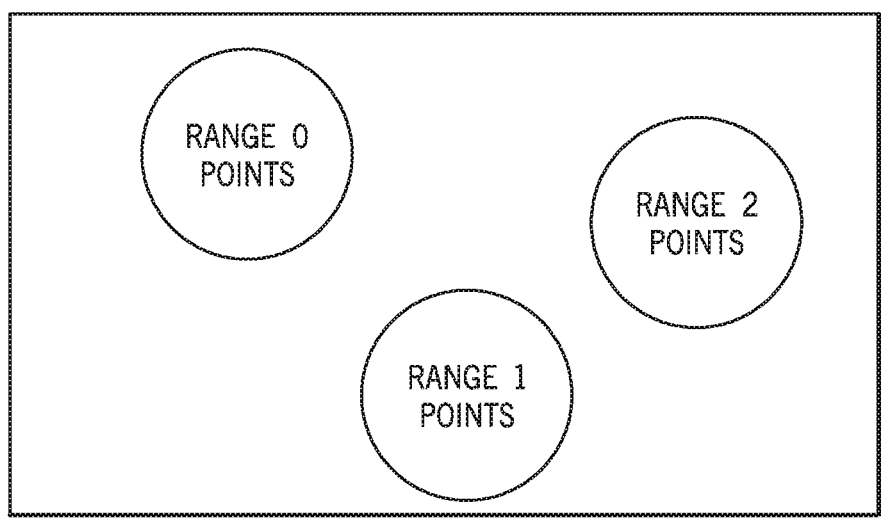
Figure 21:
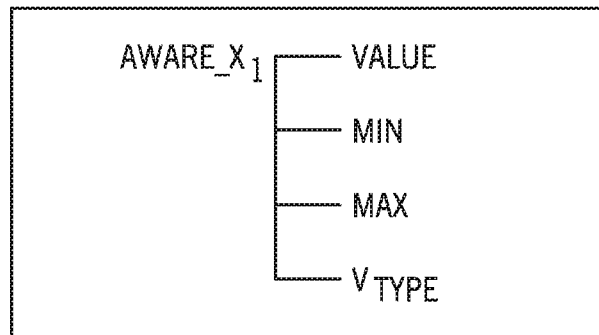
Figure 22:
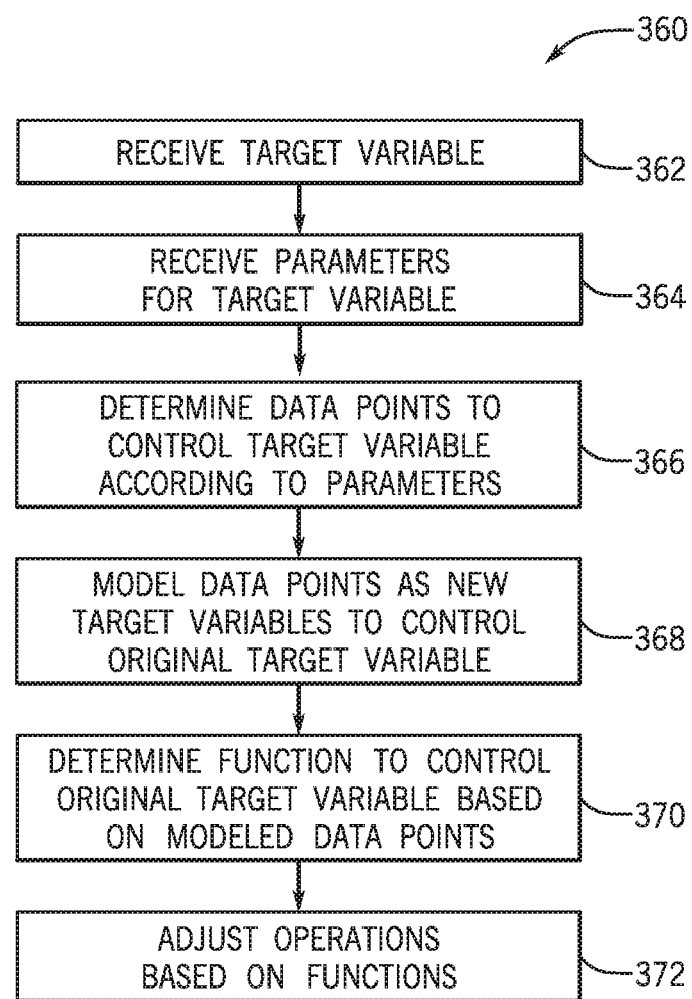
Figure 23:
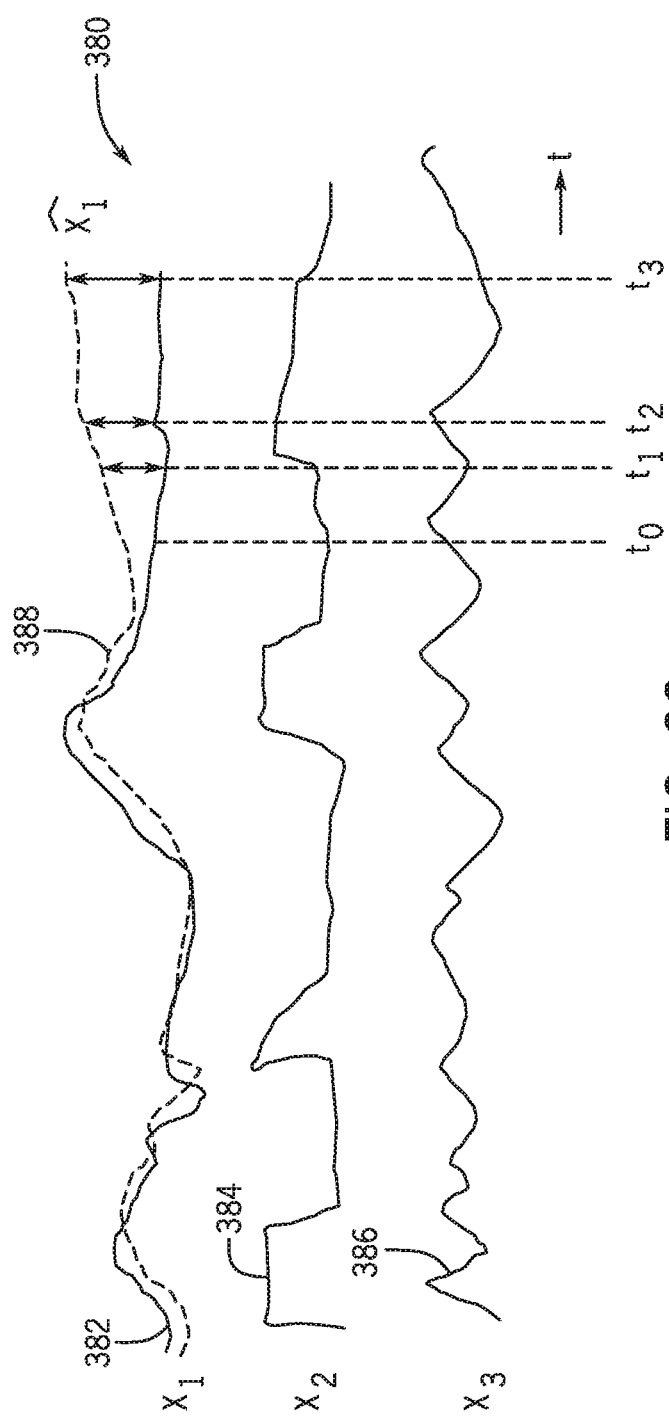
Figure 24:
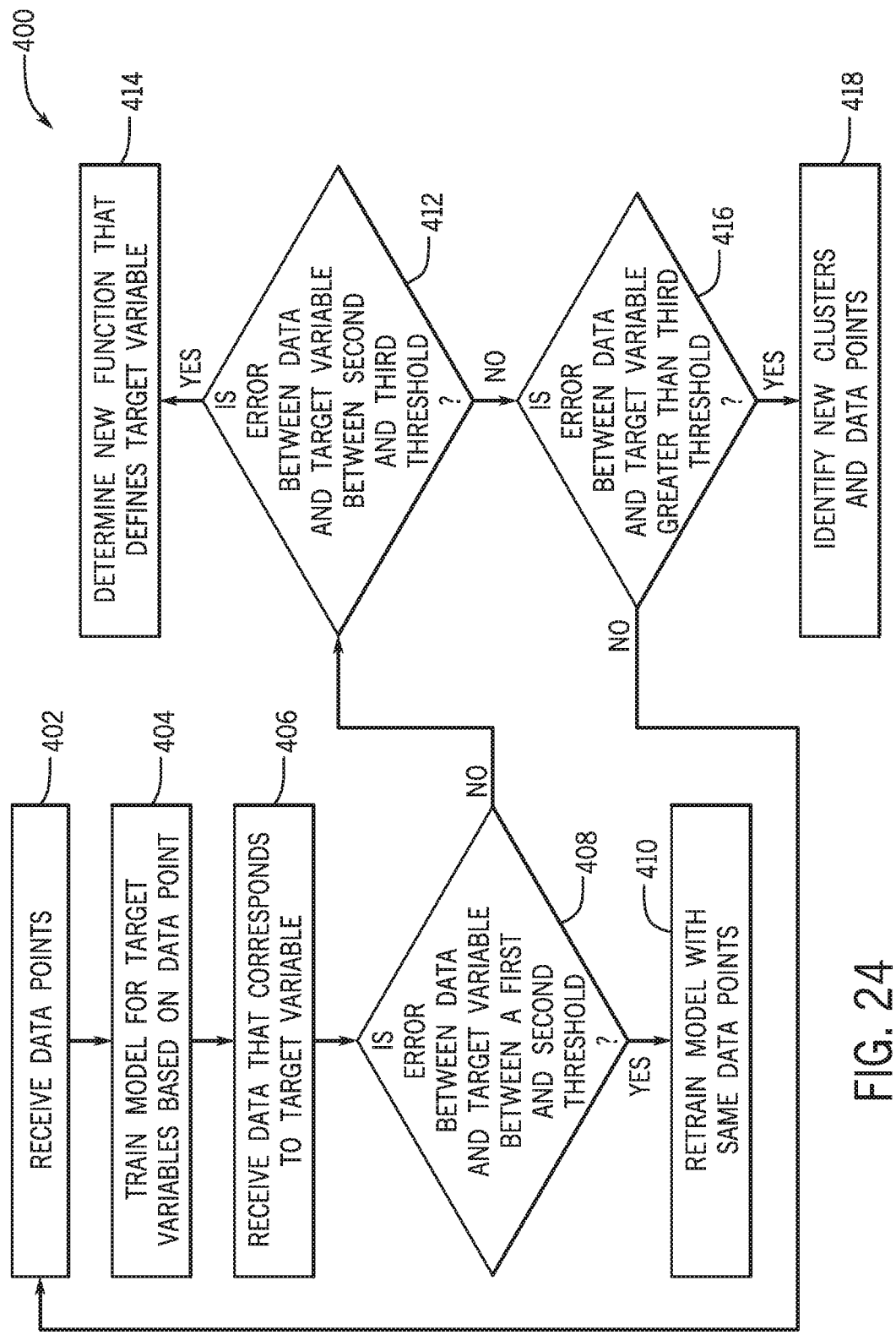

FIG. 9 describes an example encryption process that may be employed by a module of the local control system, in accordance with an embodiment;

FIG. 10 illustrates a flow chart of a method for decrypting the encrypted information determined using the method of FIG. 9, in accordance with an embodiment;

FIG. 11 illustrates a flow chart of a method for identifying target variables for an artificial intelligence (AI) module to model, in accordance with an embodiment;

FIG. 12 illustrates a multi-dimensional graph including five identified clusters, in accordance with an embodiment;

FIG. 13 illustrates a flow chart of a method for identifying the target variables of a particular cluster of data points, in accordance with an embodiment;

FIG. 14 illustrates an example directed graph, in accordance with an embodiment;

FIG. 15 illustrates an example pruned directed graph, in accordance with an embodiment;

FIG. 16 illustrates an example directed graph that depicts relationship properties between data points, in accordance with an embodiment;

FIG. 17 illustrates a flowchart of a method determining strength of relationships between data points, in accordance with an embodiment;

FIG. 18 illustrates a flowchart of a method for plotting data points in informational space, in accordance with an embodiment;

FIG. 19 illustrates a sample graph of position, torque, and velocity values aligned with respect to sequence, in accordance with an embodiment;

FIG. 20 illustrates an informational space map, in accordance with an embodiment;

FIG. 21 illustrates an example set of parameters that may define a target variable, in accordance with an embodiment;

FIG. 22 illustrates a flow chart of a method for adjusting operations of an industrial automation device based on modeling operations, in accordance with an embodiment;

FIG. 23 illustrates an example set of waveforms that may define a target variable, in accordance with an embodiment; and FIG. 24 illustrates a flow chart of a method for retraining a model for a target variable, in accordance with an embodiment.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As discussed above, a control system may control operation of one or more automation devices to facilitate performing an industrial automation process. Industrial automation processes may be used in various contexts, such as a manufacturing plant, a resource extraction system, a hydrocarbon extraction site, a chemical refinery facility, an industrial plant, a power generation system, a mining system, a brewery, or the like. For example, in a resource extraction system context, a control system may control load and position of a rod pump (e.g., an automation device) to perform an oil extraction process. Although examples are provided with regard to specific contexts, one of ordinary skill in the art will recognize that these examples are not intended to be limiting and that the techniques described herein can be used with any suitable context.

To improve operation, the control system may monitor performance of the one or more automation devices and/or the industrial automation process as a whole. For example, the control system may determine whether operation is as desired by analyzing process data. As used herein, "process data" is intended to describe data indicative of operation of an industrial automation process. For example, the process data may include inputs to the industrial automation process, outputs from the industrial automation process, disturbance variables (e.g., environmental conditions), constraints on operation, operational parameters (e.g., temperature, speed, load, position, voltage, and/or pressure) of an automation device, and the like.

Additionally, the control system may perform diagnostics to facilitate identifying cause of undesired operation and remedying the undesired operation. For example, the control system may analyze the process data to determine a likely cause of undesired operation and possible steps to remedy the likely cause. As such, the control system may analyze the process data to facilitate performance monitoring and/or diagnostics.

When monitoring performance and/or performance diagnostics in real-time or near-real time (e.g., online during operation of the industrial automation process), the control system may be limited with regard to computing resources and time that may be allocated to analyze the process data. Moreover, the amount of process data analyzed to monitor performance and/or perform diagnostics generally increases with complexity of the industrial automation process. For example, since process data may include operation parameters of automation devices, the amount of process data may increase as number of automation devices used in the industrial automation process increases. Additionally, since process may data may include environmental conditions, the amount of process data may increase as distribution size of automation devices used in the industrial automation process increases.

With the foregoing in mind, as the process data is collected regularly (e.g., time-series data), the collected data may be transmitted to an onsite server, a cloud-computing system, a cloud-based service, or the like. Traditionally, the onsite server or the cloud-computing system would leverage its processing power to enable an expert (e.g. a data scientist) to efficiently analyze and interpret the data (e.g., time-series data) due to the amount of data collected in real-time. However, as the volume and velocity of the data collected from industrial automation systems, it is now recognized that the infrastructure and cost associated with this approach may not be an efficient use of resources. For example, as cloud-computing systems have been used more frequently, the additional costs, the complex logistics, and the security concerns with regard to using cloud-computing systems to analyze and store process data have made the cloud-based analysis less attractive. By way of example, when assessing problems and identifying solutions to the problems in an industrial automation system, analysis of data pertaining to a particular part or portion of the industrial automation system may be performed effectively with a local controller or control system without the use of the processing power of the cloud-computing system and without the presence of the human expert (e.g. a data scientist) in the online work flow of data analysis. Indeed, controllers and/or computing modules that are locally present at the portion of the industrial automation system may have access to the information that is used to respond to a request for information, and may be able to provide an answer for the request based on data that is locally available without the computing resources of a cloud-computing device.

Accordingly, as will be described in more detail below, the present disclosure provides techniques to improve efficiency of performance monitoring and/or diagnostics, for example, to facilitate performance in real-time or near real-time using local controllers or control systems. In some embodiments, a local control system or controller may have access to data that may enable the local control system to determine root causes for detected issues (e.g., alarms), determine preventative actions to avoid certain undesirable operating conditions, perform certain types of analysis, and the like. As discussed above, since the local control system may perform these types of analysis without the computing resources of a cloud-computing device, the results of the analysis may be communicated to other control systems or computing devices without transmitting the data outside a local area network that connects to other components of the industrial automation system. That is, the analyzed data may be communicated to other components in the industrial automation system without sending the data to the cloud or outside the bounds created by the local area network of the industrial automation system.

In some embodiments, the local control system may be made up of a number of modules or components that perform various operations with respect to controlling the operations of an automation device or the like. For example, the local control system may include an input/output (I/O) module that facilitates the communication of data between sensors and other control systems, a controller module that controls the operation of the respective industrial automation device, an artificial intelligence (AI) module that performs certain types of analysis using models, algorithms, machine-learning techniques, and the like. The components part of the local control system may communicate with each other via a communication backplane or the like.

The AI module may, in some embodiments, receive a request for information that may involve determining a state of the industrial automation device, a root cause for a problem associated with the industrial automation device, or the like. Using the data available to the AI module via the modules of the local control system, the AI module may perform the requested analysis automatically without receiving data unavailable to the local control system. Moreover, the AI module may perform the analysis using the computing resources of the AI module without transmitting data outside of the local control system for analysis. In this way, the AI module may efficiently perform the requested analysis without compromising the integrity of the data by communicating the data outside of the local area network.

To enable the automated analysis of the real-time control system data, the self-driving AI module disclosed herein may be equipped with an auto-monitoring capability where the output of the AI module (e.g. prediction of a target variable) is compared to the actual output (e.g. real-time measurements of the target variable) and a measure of output quality is created. If an acceptable measure of quality is not reached after some time (e.g., defined by the user for example), the AI module will inform the automation system (e.g., control system) that the analysis of the available data does not yield an acceptable answer to the requested information and therefore further steps must be taken. For example, the user can decide to check available data for validity or make additional data available to the AI module if possible. The AI module may also include the intelligence to expand the domain of data included for analysis. This capability may assist in optimizing the communication bandwidth in an automation/control system. For example, in a control system with several thousand variables (e.g., tags), it may not be prudent to consider all these tags for analysis at one time. As such, the AI module may include the intelligence to examine selected subsets of the available variables in a methodical manner and retain only the variables that it finds as most effective (e.g., resulting in movement to desired change) for the analysis.

To ensure that the data communicated between local components of a local control system or between components of the local area network in the industrial automation system is secure, certain security measures may by undertaken to prevent potential hackers from accessing the data. For example, the local control system may encrypt data communicated between local components connected via the communication backplane. For instance, the controller module of the local control system may interact with the other local components in a secure manner by encrypting data communicated there between. In this way, the data communicated between components may be protected from snooping, tampering, or modifying actions that may be performed by entities trying to gain access to the data. Additional details with regard to facilitating the communication between the components of the local control system will be discussed below with reference to FIGS. 1-24.

Figure 1:
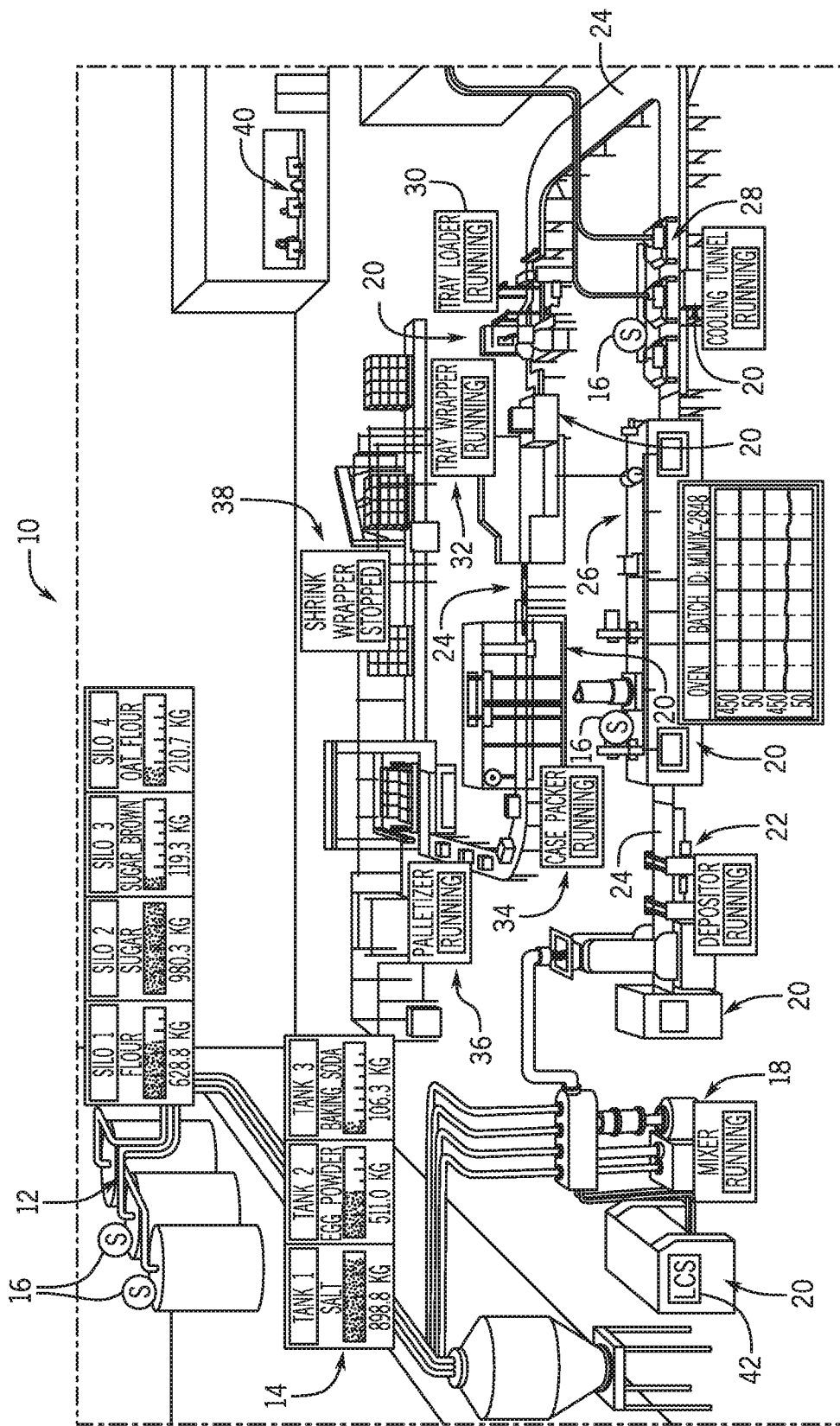
FIG. 1 illustrates an example industrial automation system employed by a food manufacturer, in accordance with an embodiment.

By way of introduction, FIG. 1 illustrates an example industrial automation system 10 employed by a food manufacturer. It should be noted that although the example industrial automation system 10 of FIG. 1 is directed at a food manufacturer, the present embodiments described herein may be employed within any suitable industry, such as automotive, mining, hydrocarbon production, manufacturing, and the like. The following brief description of the example industrial automation system 10 employed by the food manufacturer is provided herein to help facilitate a more comprehensive understanding of how the embodiments described herein may be applied to industrial devices to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials may be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may be used to provide power to the machinery used to perform certain tasks, provide protection to the machinery from electrical surges, prevent injuries from occurring with human operators in the industrial automation system 10, monitor the operations of the respective device, communicate data regarding the respective device to a supervisory control system 40, and the like. In some embodiments, each industrial automation device 20 or a group of industrial automation devices 20 may be controlled using a local control system 42. The local control system 42 may include receive data regarding the operation of the respective industrial automation device 20, other industrial automation devices 20, user inputs, and other suitable inputs to control the operations of the respective industrial automation device(s) 20.

Figure 2:
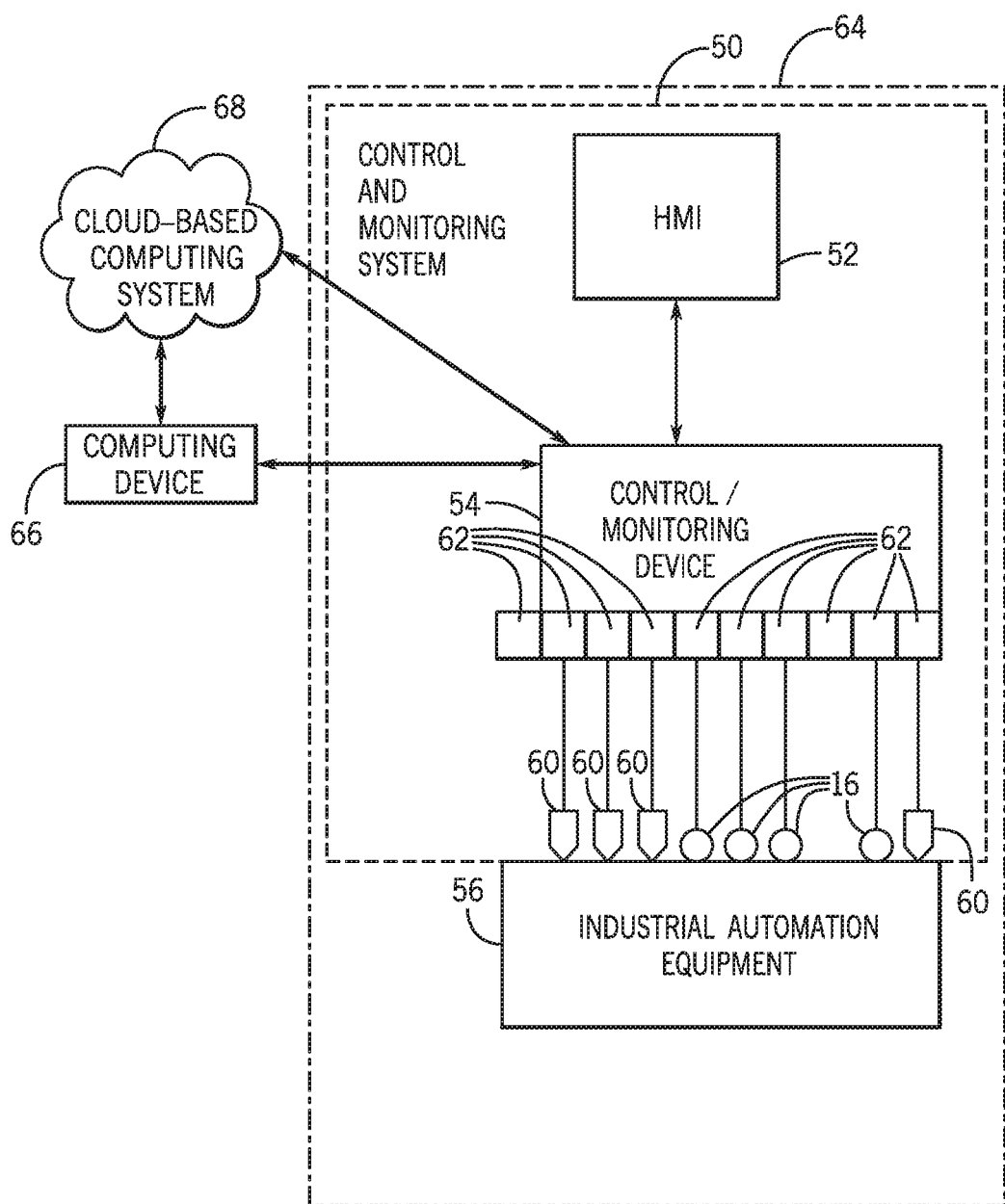
FIG. 2 illustrates a diagrammatical representation of an exemplary control and monitoring system that may be employed in any suitable industrial automation system, in accordance with an embodiment.

By way of example, FIG. 2 illustrates a diagrammatical representation of an exemplary control and monitoring system 50 that may be employed in any suitable industrial automation system 10, in accordance with embodiments presented herein. In FIG. 2, the control and monitoring system 50 is illustrated as including a human machine interface (HMI) 52 and a control/monitoring device 54 or automation controller adapted to interface with devices that may monitor and control various types of industrial automation equipment 56. By way of example, the industrial automation equipment 56 may include the mixer 18, the depositor 22, the conveyor 24, the oven 26, and the other pieces of machinery described in FIG. 1.

It should be noted that the HMI 52 and the control/monitoring device 54, in accordance with embodiments of the present techniques, may be facilitated by the use of certain network strategies. Indeed, an industry standard network may be employed, such as DeviceNet, to enable data transfer. Such networks permit the exchange of data in accordance with a predefined protocol, and may provide power for operation of networked elements.

As discussed above, the industrial automation equipment 56 may take many forms and include devices for accomplishing many different and varied purposes. For example, the industrial automation equipment 56 may include machinery used to perform various operations in a compressor station, an oil refinery, a batch operation for making food items, a mechanized assembly line, and so forth. Accordingly, the industrial automation equipment 56 may comprise a variety of operational components, such as electric motors, valves, actuators, temperature elements, pressure sensors, or a myriad of machinery or devices used for manufacturing, processing, material handling, and other applications.

Additionally, the industrial automation equipment 56 may include various types of equipment that may be used to perform the various operations that may be part of an industrial application. For instance, the industrial automation equipment 56 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 56 may be made up of certain automation devices 20, which may include controllers, input/ output (I/O) modules, motor control centers, motors, human machine interfaces (HMIs), operator interfaces, contactors, starters, sensors 16, actuators, drives, relays, protection devices, switchgear, compressors, firewall, network switches (e.g., Ethernet switches, modular-managed, fixed-managed, service-router, industrial, unmanaged, etc.) and the like.

In certain embodiments, one or more properties of the industrial automation equipment 56 may be monitored and controlled by certain equipment for regulating control variables used to operate the industrial automation equipment 56. For example, the sensors 16 and actuators 60 may monitor various properties of the industrial automation equipment 56 and may adjust operations of the industrial automation equipment 56, respectively.

In some cases, the industrial automation equipment 56 may be associated with devices used by other equipment. For instance, scanners, gauges, valves, flow meters, and the like may be disposed on industrial automation equipment 56. Here, the industrial automation equipment 56 may receive data from the associated devices and use the data to perform their respective operations more efficiently. For example, a controller (e.g., control/monitoring device 54) of a motor drive may receive data regarding a temperature of a connected motor and may adjust operations of the motor drive based on the data.

In certain embodiments, the industrial automation equipment 56 may include a communication component that enables the industrial equipment 56 to communicate data between each other and other devices. The communication component may include a network interface that may enable the industrial automation equipment 56 to communicate via various protocols such as Ethernet/IP®, ControlNet®, DeviceNet®, or any other industrial communication network protocol. Alternatively, the communication component may enable the industrial automation equipment 56 to communicate via various wired or wireless communication protocols, such as Wi-Fi, mobile telecommunications technology (e.g., 2G, 3G, 4G, LTE), Bluetooth®, near-field communications technology, and the like.

The sensors 16 may be any number of devices adapted to provide information regarding process conditions. The actuators 60 may include any number of devices adapted to perform a mechanical action in response to a signal from a controller (e.g., the control/monitoring device 54). The sensors 16 and actuators 60 may be utilized to operate the industrial automation equipment 56. Indeed, they may be utilized within process loops that are monitored and controlled by the control/monitoring device 54 and/or the HMI 52. Such a process loop may be activated based on process inputs (e.g., input from a sensor 16) or direct operator input received through the HMI 52. As illustrated, the sensors 16 and actuators 60 are in communication with the control/monitoring device 54. Further, the sensors 16 and actuators 60 may be assigned a particular address in the control/monitoring device 54 and receive power from the control/monitoring device 54 or attached modules.

Input/output (I/O) modules 62 may be added or removed from the control and monitoring system 50 via expansion slots, bays or other suitable mechanisms. In certain embodiments, the I/O modules 62 may be included to add functionality to the control/monitoring device 54, or to accommodate additional process features. For instance, the I/O modules 62 may communicate with new sensors 16 or actuators 60 added to monitor and control the industrial automation equipment 56. It should be noted that the I/O modules 62 may communicate directly to sensors 16 or actuators 60 through hardwired connections or may communicate through wired or wireless sensor networks, such as Hart or IOLink.

Generally, the I/O modules 62 serve as an electrical interface to the control/monitoring device 54 and may be located proximate or remote from the control/monitoring device 54, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, Ethernet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 62 may transfer input and output signals between the control/monitoring device 54 and the industrial automation equipment 56. As illustrated, the sensors 16 and actuators 60 may communicate with the control/monitoring device 54 via one or more of the I/O modules 62 coupled to the control/monitoring device 54.

In certain embodiments, the control/monitoring system 50 (e.g., the HMI 52, the control/monitoring device 54, the sensors 16, the actuators 60, the I/O modules 62) and the industrial automation equipment 56 may make up an industrial automation application 64. The industrial automation application 64 may involve any type of industrial process or system used to manufacture, produce, process, or package various types of items. For example, the industrial applications 64 may include industries such as material handling, packaging industries, manufacturing, processing, batch processing, the example industrial automation system 10 of FIG. 1, and the like.

In certain embodiments, the control/monitoring device 54 may be communicatively coupled to a computing device 66 and a cloud-based computing system 68. In this network, input and output signals generated from the control/monitoring device 54 may be communicated between the computing device 66 and the cloud-based computing system 68. Although the control/monitoring device 54 may be capable of communicating with the computing device 66 and the cloud-based computing system 68, as mentioned above, in certain embodiments, the control/monitoring device 54 (e.g., local computing system 42) may perform certain operations and analysis without sending data to the computing device 66 or the cloud-based computing system 68.

Figure 3:
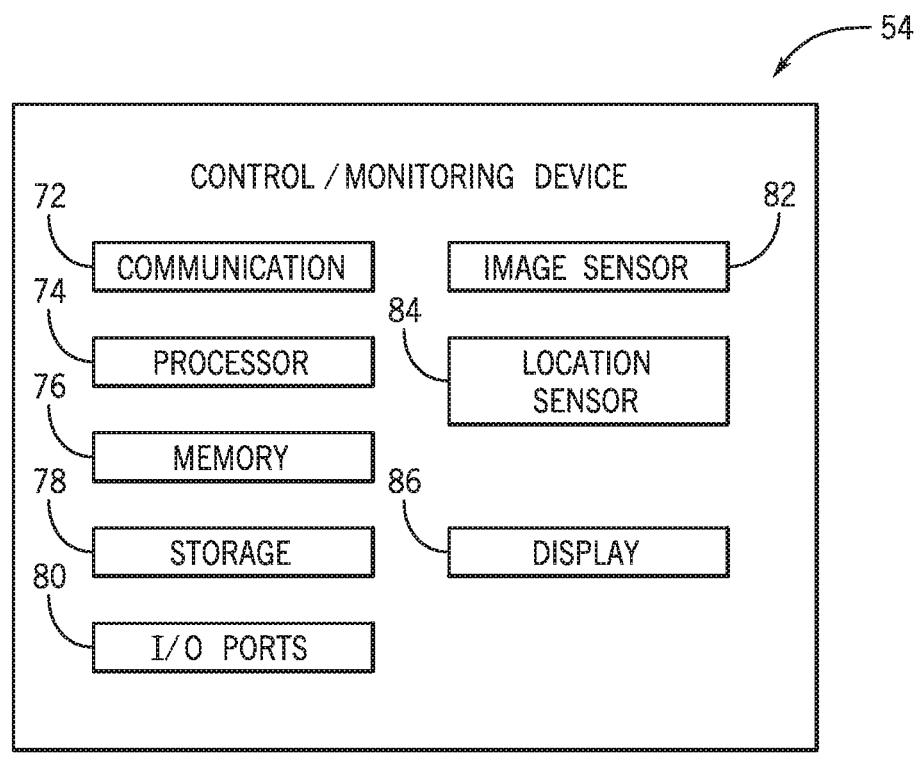
FIG. 3 illustrates example components that may be part of a control/monitoring device in a control system for the industrial automation system, in accordance with an embodiment.

In any case, FIG. 3 illustrates example components that may be part of the control/monitoring device 54, in accordance with embodiments presented herein. For example, the control/monitoring device 54 may include a communication component 72, a processor 74, a memory 76, a storage 78, input/output (I/O) ports 80, an image sensor 82 (e.g., a camera), a location sensor 84, a display 86, additional sensors (e.g., vibration sensors, temperature sensors), and the like. The communication component 72 may be a wireless or wired communication component that may facilitate communication between the industrial automation equipment 56, the cloud-based computing system 68, and other communication capable devices.

The processor 74 may be any type of computer processor or microprocessor capable of executing computer-executable code. The processor 74 may also include multiple processors that may perform the operations described below. The memory 76 and the storage 78 may be any suitable articles of manufacture that can serve as media to store processor-executable code, data, or the like. These articles of manufacture may represent computer-readable media (e.g., any suitable form of memory or storage) that may store the processor-executable code used by the processor 74 to perform the presently disclosed techniques. Generally, the processor 74 may execute software applications that include programs that enable a user to track and/or monitor operations of the industrial automation equipment 56 via a local or remote communication link. That is, the software applications may communicate with the control/monitoring device 54 and gather information associated with the industrial automation equipment 56 as determined by the control/monitoring device 54, via the sensors 16 disposed on the industrial automation equipment 56 and the like.

The memory 76 and the storage 78 may also be used to store the data, analysis of the data, the software applications, and the like. The memory 76 and the storage 78 may represent non-transitory computer-readable media (e.g., any suitable form of memory or storage) that may store the processor-executable code used by the processor 74 to perform various techniques described herein. It should be noted that non-transitory merely indicates that the media is tangible and not a signal.

In one embodiment, the memory 76 and/or storage 78 may include a software application that may be executed by the processor 74 and may be used to monitor, control, access, or view one of the industrial automation equipment 56. As such, the computing device 66 may communicatively couple to industrial automation equipment 56 or to a respective computing device of the industrial automation equipment 56 via a direct connection between the devices or via the cloud-based computing system 58. The software application may perform various functionalities, such as track statistics of the industrial automation equipment 56, store reasons for placing the industrial automation equipment 56 offline, determine reasons for placing the industrial automation equipment 56 offline, secure industrial automation equipment 56 that is offline, deny access to place an offline industrial automation equipment 56 back online until certain conditions are met, and so forth.

The I/O ports 80 may be interfaces that may couple to other peripheral components such as input devices (e.g., keyboard, mouse), sensors, input/output (I/O) modules, and the like. I/O modules may enable the computing device 66 or other control/monitoring devices 54 to communicate with the industrial automation equipment 56 or other devices in the industrial automation system via the I/O modules.

The image sensor 82 may include any image acquisition circuitry such as a digital camera capable of acquiring digital images, digital videos, or the like. The location sensor 84 may include circuitry designed to determine a physical location of the computing device 66. In one embodiment, the location sensor 84 may include a global positioning system (GPS) sensor that acquires GPS coordinates for the control/monitoring device 54.

The display 86 may depict visualizations associated with software or executable code being processed by the processor 74. In one embodiment, the display 86 may be a touch display capable of receiving inputs (e.g., parameter data for operating the industrial automation equipment 56) from a user of the control/monitoring device 54. As such, the display 86 may serve as a user interface to communicate with the industrial automation equipment 56. The display 86 may be used to display a graphical user interface (GUI) for operating the industrial automation equipment 56, for tracking the maintenance of the industrial automation equipment 56, and the like. The display 86 may be any suitable type of display, such as a liquid crystal display (LCD), plasma display, or an organic light emitting diode (OLED) display, for example. Additionally, in one embodiment, the display 86 may be provided in conjunction with a touch-sensitive mechanism (e.g., a touch screen) that may function as part of a control interface for the industrial automation equipment 56 or for a number of pieces of industrial automation equipment in the industrial automation application 64, to control the general operations of the industrial automation application 64. In some embodiments, the operator interface may be characterized as the HMI 52, a human-interface machine, or the like.

Although the components described above have been discussed with regard to the control/monitoring device 54, it should be noted that similar components may make up other computing devices described herein. Further, it should be noted that the listed components are provided as example components and the embodiments described herein are not to be limited to the components described with reference to FIG. 3.

Referring back to FIG. 2, in operation, the industrial automation application 64 may receive one or more inputs used to produce one or more outputs. For example, the inputs may include feedstock, electrical energy, fuel, parts, assemblies, sub-assemblies, operational parameters (e.g., sensor measurements), or any combination thereof. Additionally, the outputs may include finished products, semi-finished products, assemblies, manufacturing products, by products, or any combination thereof To produce the one or more outputs, the control/monitoring device 54 may control operation of the industrial automation application 64. In some embodiments, the control/monitoring device 54 may control operation by outputting control signals to instruct industrial automation equipment 56 to perform a control action by implementing manipulated variable set points. For example, the control/monitoring device 54 may instruct a motor (e.g., an automation device 20) to implement a control action by actuating at a particular speed (e.g., a manipulated variable set point).

In some embodiments, the control/monitoring device 54 may determine the manipulated variable set points based at least in part on process data. As described above, the process data may be indicative of operation of the industrial automation device 20, the industrial automation equipment 56, the industrial automation application 64, and the like. As such, the process data may include operational parameters of the industrial automation device 20 and/or operational parameters of the industrial automation application 65. For example, the operational parameters may include any suitable type, such as temperature, flow rate, electrical power, and the like.

Thus, the control/monitoring device 54 may receive process data from one or more of the industrial automation devices 20, the sensors 16, or the like. In some embodiments, the sensor 16 may determine an operational parameter and communicate a measurement signal indicating the operational parameter to the control/monitoring device 54. For example, a temperature sensor may measure temperature of a motor (e.g., an automation device 20) and transmit a measurement signal indicating the measured temperature to the control/monitoring device 54. The control/monitoring device 54 may then analyze the process data to monitor performance of the industrial automation application 64 (e.g., determine an expected operational state) and/or perform diagnostics on the industrial automation application 64.

To facilitate controlling operation and/or performing other functions, the control/monitoring device 54 may include one or more controllers, such as one or more model predictive control (MPC) controllers, one or more proportional-integral-derivative (PID) controllers, one or more neural network controllers, one or more fuzzy logic controllers, or any combination thereof.

In some embodiments, the supervisory control system 40 may provide centralized control over operation of the industrial automation application 64. For example, the supervisory control system 40 may enable centralized communication with a user (e.g., operator). To facilitate, the supervisory control system 40 may include the display 86 to facilitate providing information to the user. For example, the display 86 may display visual representations of information, such as process data, selected features, expected operational parameters, and/or relationships there between. Additionally, the supervisory control system 40 may include similar components as the control/monitoring device 54 described above in FIG. 3.

On the other hand, the control/monitoring device 54 may provide localized control over a portion of the industrial automation application 64 via the local control system 42. For example, in the depicted embodiment of FIG. 1, the local control system 42 that may be part of the mixer 18 may provide control over operation of a first automation device 20 that controls the mixer 18, and a second local control system 42 may provide control over operation of a second automation device 20 that controls the operation of the depositor 22.

In some embodiments, the local control system 42 may control operation of a portion of the industrial automation application 64 based at least in part on the control strategy determined by the supervisory control system 40. Additionally, the supervisory control system 40 may determine the control strategy based at least in part on process data determined by the local control system 42. Thus, to implement the control strategy, the supervisory control system 40 and the local control systems 42 may be communicatively coupled via a network, which may be any suitable type, such as an Ethernet/IP network, a ControlNet network, a DeviceNet network, a Data Highway Plus network, a Remote I/O network, a Foundation Fieldbus network, a Serial, DH-485 network, a SynchLink network, or any combination thereof.

It should be appreciated that the described embodiment of the local control system 42 is merely intended to be illustrative and not limiting. The local control system 42 may include one or more components of the control/monitoring device 54. In some cases, the control/monitoring device 54 may be one component of the local control system 42. That is, the control/monitoring device 54 may be part of a collection of modules, such as a control system 100 (e.g., local control system 42) depicted in FIG. 4.

Figure 4:
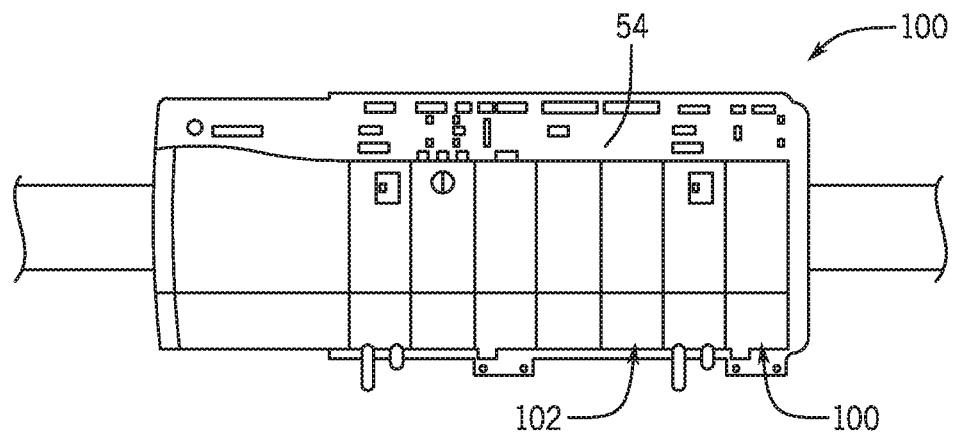
FIG. 4 illustrates an example control system with a number of modules, in accordance with an embodiment.

As shown in FIG. 4, the control system 100 may include the control/monitoring device 54 as a single module of a number of modules that perform various types of operations. For instance, the control system 100 may also include an artificial intelligence (AI) module 102, an input/output module 104, and the like. The control system 100 may be coupled to a data backplane 106 that may facilitate communication between modules of the control system 100.

Figure 5:
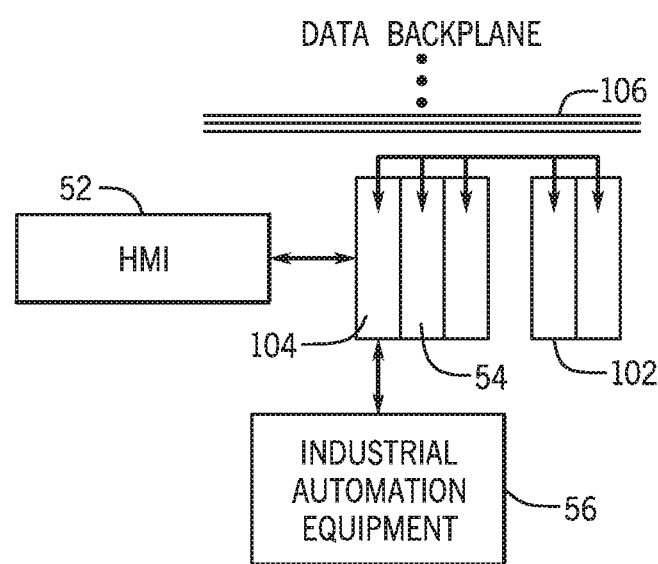
FIG. 5 is a block diagram representative of the control system of FIG. 4, in accordance with an embodiment.

For example, FIG. 5 illustrates a block diagram of the control system 100 that may include the control/monitoring device 54 the AI module 102 and the I/O module 104 coupled to each other via the data backplane 106. The data backplane 106 is provided over which multiple automation components may communicate. As will be appreciated by those skilled in the art, such backplanes may allow for physical mounting of modular devices, such as automation controllers, input/output devices, and so forth. In the illustration, the AI module 102 may include processing circuitry, memory circuitry, communications circuitry, and so forth to perform various types of analytical operations. Data communication over the backplane 106 may allow for raw, process, or other data to be accessed by the AI module 102 via other modules of the control system 100, the I/O module 102, or the like. Data may also be output from the control system 100 via the data backplane 106. For instance, the I/O module 104 may output visualization data to the HMI 52, which may present the visualization data via an electronic display.

As mentioned above, data is collected or accessible to local controllers and/or computing modules, such as the local control system 42, that are locally present at the portion of the industrial automation system 10 may include the relevant information that may be useful for responding to a request for information. Indeed, in some embodiments, the local control system 42 may be able to provide an answer for the request based on data that is locally available if they receive the request. With this in mind, it may be useful to ensure that requests for particular types of information is forwarded to the appropriate local control system 42 that has access to the relevant information.

Figure 6:
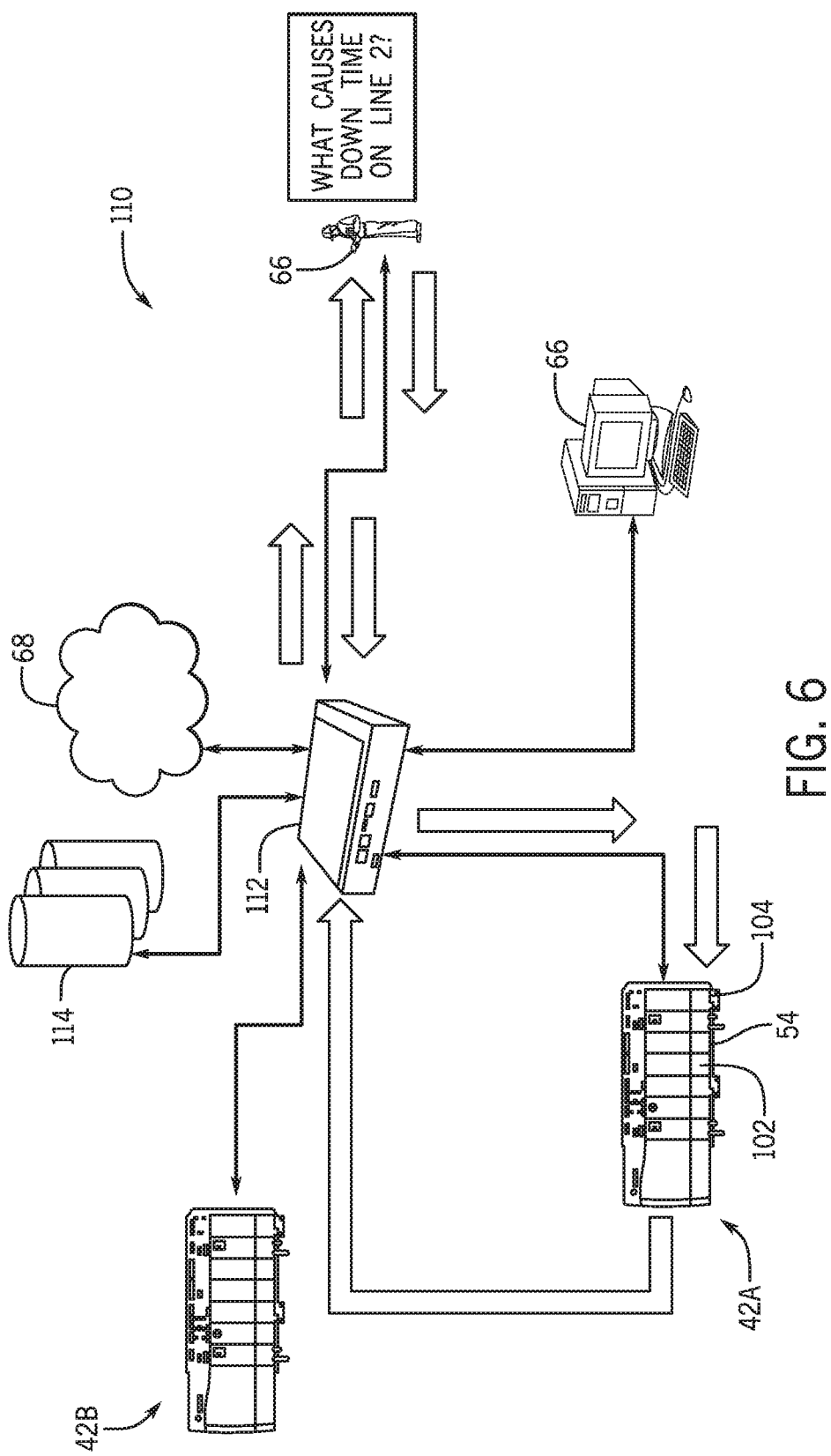
FIG. 6 illustrates a communication network that routes requests for information or data through a routing system to a local control system, in accordance with an embodiment.

For example, FIG. 6 illustrates a communication network 110 that routes requests for information or data through a routing system 112 (e.g., router) to a local control system 42 that may include the AI module 102, the control/monitoring device 54, the I/O module 104 and the like. In some embodiments, the routing system 112 may include the components described above as part of the control/monitoring device 54 and may communicatively couple to a number of local control systems 42, the cloud-based computing system 68, the computing device 66, and other suitable communication-enabled devices. The routing system 112 may also have access to one or more databases 114 that may include information regarding various types of data and the storage locations of the data. That is, in some embodiments, data pertaining to different portions of the industrial automation system 10, particular industrial automation devices 20, industrial automation equipment 56, and the like may be stored in various locations within the network 110 including the database 114. The databases 114 may include a list of storage locations for each dataset or type of data, such that the routing system 112 may route various types of data to certain devices or control systems for analysis.

By way of example, the routing system 112 may receive a request from a user via the computing device 66 or the like to determine a cause for downtime or reduced production or operation of line 2 in the industrial automation system 10. After receiving the request, the routing system 112 may determine the local control system 42A of the industrial equipment related to line 2 indicated in the request. In some embodiments, the routing system 112 may determine that datasets relevant to the operation of line 2 may also be present in the databases 114 or other data sources that are not local to the local control system 42A. In any case, the datasets related to the operation of line 2 may be retrieved from various the data sources, the industrial automation equipment 56, the databases 114, and the like by the routing system 112.

The routing system 112 may then route the identified datasets along with the request to the local control system 42A that may be best suited to determine the answer to the request. Like the control system 100 of FIG. 5, the local control system 42A may include a collection of modules that perform various tasks for the operation of the industrial equipment related to line 2. That is, the local control system 42A may be a local control system for controlling and monitoring the operations of line 2. One of the modules of the local control system may include the AI module 102, which may have access to the data available to the control/monitoring device 54 related to the operations of line 2. The AI module 102 may be designed to perform certain types of analysis to identify solutions and/or respond to requests provided to it. Using the data available to the AI module 102, the AI module 102 may determine a solution or answer to the request and send the solution back to the user via the network 110.

To determine the solution or answer to the request, the AI module 102 may include certain analytic and/or machine learning algorithms that enable the AI module 102 to parse the request and identify likely answers to the request based on various types of models, artificial intelligence methodologies, and the like. As such, the user of the control system 100 may have access to real time solutions for potential problems or information requests without waiting for input from individual subject matter experts.

Figure 7:
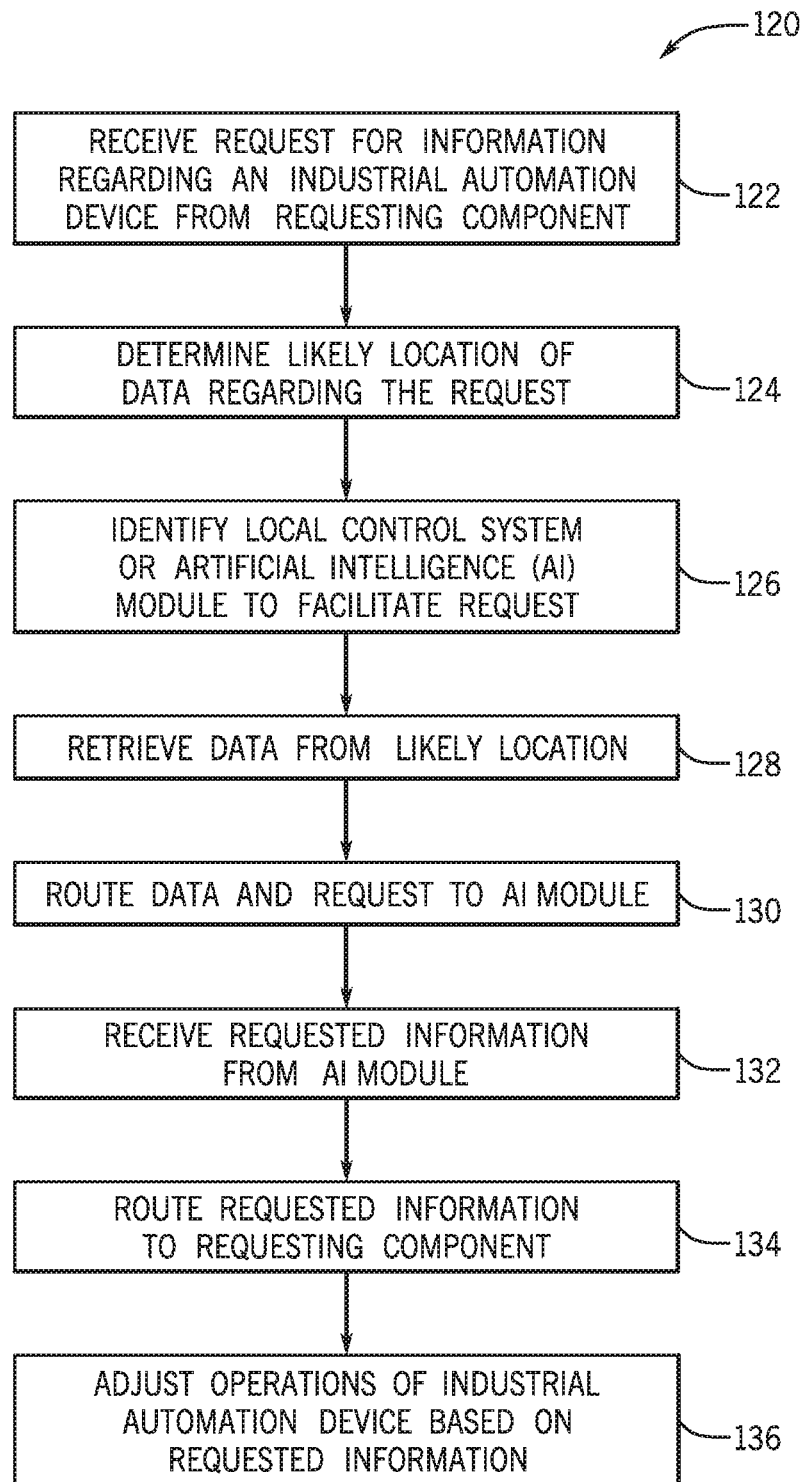
FIG. 7 illustrates a flow chart of a method for controlling operations of the industrial automation equipment using a control system that is locally connected to datasets regarding the industrial automation equipment, in accordance with an embodiment.

With the foregoing in mind, FIG. 7 illustrates a flow chart of a method 120 for controlling the operations of the industrial automation equipment 56 or one or more industrial automation devices 20 using the control system 100 that is locally connected to the datasets regarding the industrial automation system 100. Although the method 120 is described as being performed by the routing system 112, it should be noted that any suitable computing device or edge-computing device capable of communicating with other components in the industrial automation system 10. The edge-computing device may include any suitable computing device 66 or control system 100 where data may be created, analyzed, or accessed, such that inferences, predictions, or the like may be determined.

Additionally, although the method 120 is described as being performed in a particular order, it should be understood that the method 120 may be performed in any suitable order. Referring now to FIG. 7, at block 122, the routing system 112 may receive a request for information regarding one or more particular industrial automation devices 20 from a requesting component. The requesting component may include the computing device 66 being operated by a user, a control system 100 that requests that information to perform a respective analysis, or the like.

In one embodiment, the request may include details related to the information requested. For example, the details may be related to a specific portion of the industrial automation system 10, a conveyor section of the industrial automation system 10, productivity associated with a portion of the industrial automation system 10, operating parameters regarding the portion of the industrial automation system 10, or the like. By way of example, the request for information may be related to operating parameters or outputs of the mixer 18, the depositor 22, the oven 26, or other suitable machinery in the industrial automation system 10 of FIG. 1.

At block 124, the routing system 112 may determine the likely location of one or more datasets associated with the request. That is, the routing system 112 may query the database 114 or its internal memory/storage to identify the storage locations for datasets associated with one or more parts of the request. For example, if the request specifies a particular industrial automation device 20, the routing system 112 may query a relevant index or the databases 114 to determine the local control system 42 that controls or monitors the operation of the specified industrial automation device 20.

In addition to the location of the respective local control system 42, the routing system 112 may identify datasets that may be related to the request. Continuing the example provided above, the routing system 112 may determine that datasets associated with adjacent industrial automation devices 20 or industrial automation equipment 56 may be related to the specified industrial automation device 20. For instance, if the request was related to the depositor 22 of the industrial automation system 10 in FIG. 1, the routing system 112 may determine that datasets related to the operation of the mixer 18, the conveyor 24, or the oven 26 may be related to the depositor 22 since these components are directly connected to the depositor 22.

In one embodiment, the contextualization of data can be used to identify the scope of the data that is needed to provide an answer to a request for information. More specifically, the available data may be structured in a hierarchical manner where each variable is treated as a node with potential parent node(s) and children node(s). For a request such as "what is the cause of down time on Line 2?," a contextualized data may enable intelligent filtering of the data that may be routed to the AI module 102 for the analysis. The routing system 112 may also be equipped with the intelligence to systematically interrogate the contextualized data to determine where a link in the data network can be eliminated without preventing the AI module 102 from accessing the relevant data. As such, the intelligence or programming of the routing system 112 may include a correlation analysis of the data, or a causality analysis of the data.

In some embodiments, at block 126, the routing system 112 may determine which local control system 42 may be best suited to determine the answer to the request. That is, the local control system 42 that has access to most of the information or datasets related to the request may be best suited to perform respective analysis. Each local control system 42 may include the AI module 102 mentioned above. The AI module 102 may perform the analysis to determine the answer or solution for the request for information. The request for information may include a question or query that is provided in natural language. The AI module 102 may parse the natural language request to determine an answer or response to the request using model-based analysis as provided in U.S. patent application Ser. No. 15/720,705 or U.S. Pat. No. 10,073,421, both of which is incorporated herein by reference.

At block 128, the routing system 112 may retrieve datasets identified as being relevant to the request at block 124. The routing system 112 may then, at block 130, route the datasets from the respective storage locations to the local control system 42 identified at block 126. It should be noted that, in some embodiments, the routing system 112 may not route any datasets to the identified local control system 42. The local control system 42 may have access to sufficient information that may enable the respective artificial intelligence module 102 to perform the respective analysis.

After the respective local control system 42 or the AI module 102 performs the respective analysis, it may generate data that corresponds to a response or answer to the request provided at block 122. As such, the local control system 42 may provide the output data to the routing system 112, and, at block 132, the routing system 112 may receive the output data.

At block 134, the routing system 112 may route the output data back to the requesting component of block 122. The requesting component may present the requested information via the display 86 of the corresponding device, output the requested information via audio, or the like. In some embodiments, the requested information may include a command or instructions that may be related to resolving an issue represented in the request for information. Continuing with the example provided above, the routing system 112 may receive a command from the AI module 102 that the reason for the down time in line 2 may be related to an error message received via the control/monitoring device 54 regarding the input voltage received by the industrial automation devices 20 of the depositor 22. As such, the routing system 112 may, at block 136, send a command to the local control system 42 for the depositor 22 to adjust the operations of the respective industrial automation devices 20, such that maintenance personnel may troubleshoot or perform maintenance operations on the respective industrial automation devices 20.

The command may include any suitable control or annunciation operation. For example, the command may include causing the depositor 22 to shut down, decrease its operating speed, display an alarm or notification via the display 86 of the corresponding control/monitoring device 54, or the like. In some embodiments, the command may include instructions directed at multiple industrial automation equipment 56 that may be operated by a number of control systems 100. As such, the routing system 112 may coordinate the operations of the industrial automation system 10 based on the analysis performed by the AI module 102 of one local control system 42.

In some embodiments, the AI module 102 may send the command to the control/monitoring device 54 of the local control system 42. In this way, the local control system 42 may perform analysis regarding the operations of the industrial automation system or a portion thereof and implement the control operation adjustments without interacting with other computing devices 66 or the cloud-based computing system 68. As a result, the integrity of the data communicated within the local control system 42 may be increased because it is not communicated outside of the local control system 42. Moreover, by using the data available to the local control system 42, the AI module 102 may perform analysis more efficiently to determine operation adjustments, thereby providing real-time adjustments during the operation of the industrial automation application 64.

With the foregoing in mind, to improve the data integrity communicated between components of the local control system 42, the routing system 112, the computing device 66, and other communication-enable components, the AI module 102 or other module of the local control system 42 may encrypt the data being transmitted from a respective module to prevent others from snooping, tampering, or modifying the communicated data. By way of example, the data transmitted as output by the control system may include an injected signature signal (e.g., controller certificate) that may cause the data communicated via the control system to become incomprehensible (e.g., obscure) by other devices. In certain cases, the signature signal may distort the data, such that the data may not be interpreted or analyzed for patterns or other insightful information with regard to how the data controls operations of an industrial device.

By way of example, the AI module 102 or other suitable module of the control system 100 may use a model-based security validation process. That is, the AI module 102 may include information about a security-validation model explicitly deployed in the control/monitoring device 54 (e.g., controller) to establish the authenticity of the AI module 102 after it is communicatively coupled to the control/monitoring device 54 via the data backplane 106. The AI module 102 may produce a random signal as input to security-validation model, which may be stored in a local memory of the AI module 102. The AI module may create a corresponding output of the random signal applied to the security-validation model. The AI module 102 may then send both the input random signal and the output of the security-validation model to the control/monitoring device 54. The control/monitoring device 54 may then apply the input it receives from the AI module 102 to its local version of the security-validation model. The control/monitoring device 54 may then compare the output from its local model to the output signal it received from the AI module 102. If they match, the AI module 102 may be validated and may be allowed to further communicate with the control/monitoring device 54. If, however, the two outputs do not match, access between the AI module 102 and the control/monitoring device 54 will be denied.

In some embodiments, the validation process described above may be designed and deployed in a manner that they do not interfere with the control signals that the control/monitoring device 54 generates to control the operation of the industrial automation equipment 56. As such, the validation process may not inhibit or slow down the speed in which the industrial automation equipment 56 receives operational adjustments.

Figure 8:
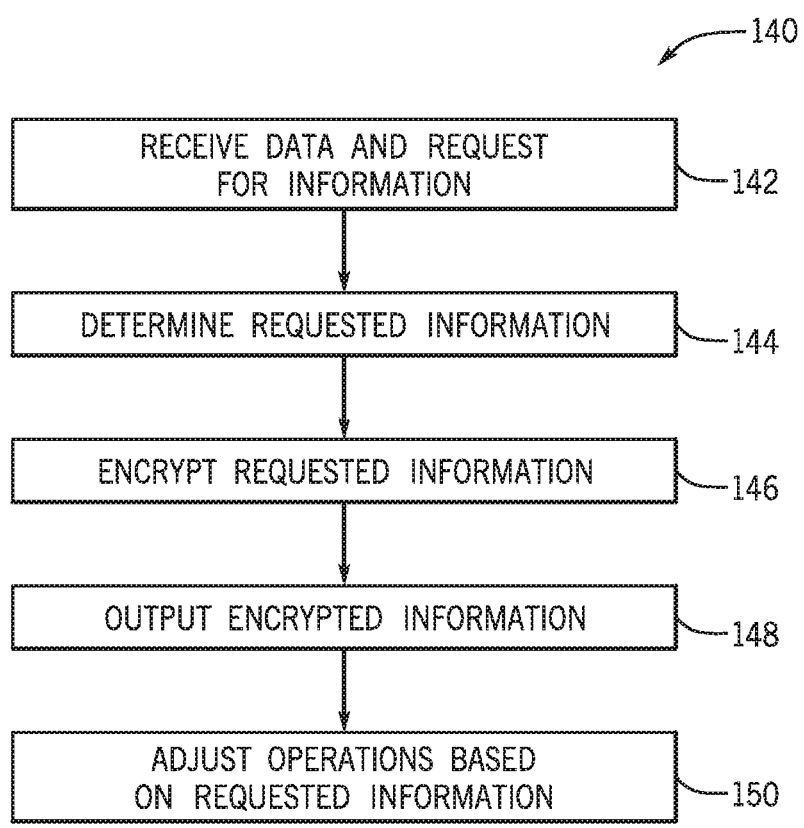
FIG. 8 illustrates a flow chart of a method for encrypting data output by the local control system, in accordance with an embodiment.

With the foregoing in mind, FIG. 8 illustrates a flow chart of a method 140 for encrypting data output by the local control system 42. Although the following discussion of the method 140 is described as being performed by the AI module 102, it should be understood that any suitable module of the control system 100 may perform the process of the method 140. In addition, it should be noted that the method 140 should not be limited to the order presented; instead, it should be understood that the method 140 may be performed in any suitable order.

Referring now to FIG. 8, at block 142, the AI module 102 may receive the request for information described above in FIG. 7. In addition, the AI module 102 may also receive data retrieved by the routing system 112, as described above with reference to block 128 of FIG. 7.

At block 144, the AI module 102 may determine the requested information using one or more algorithms stored therein, machine learning operations, trend analysis, or the like. After determining the requested information, the AI module 102 may, at block 146, encrypt the requested information using a suitable encryption protocol. By way of example, FIG. 9 describes an example encryption process that may be employed by the AI module 102. In some embodiments, the AI module 102 may encrypt data that may be output by the AI module 102 to other modules of the local control system 42. That is, if the requested information includes one or more commands that the AI module 102 may be able to initiate with the respective industrial automation equipment 56, the AI module 102 may not encrypt the output commands to ensure that the commands are transmitted to the respective industrial automation equipment 56 in a timely manner.

Data communicated between modules or outside the local control system 42, however, may be encrypted to protect the data from potential hacking attempts. As such, at block 148, the AI module 102 may output the encrypted information to a destination module or communication-enabled device (e.g., computing device 66, cloud-based computing system 68).

Based on the requested information, at block 150, the AI module 102 may generate control signals or commands to adjust one or more operations of the industrial automation equipment 56. In some embodiments, the control signals generated by the AI module 102 may be directed to components or industrial automation equipment 56 that is not locally connected to the local control system 42. As such, the encrypted information output to the routing system 112 may be parsed or decrypted to identify the destination of the control signals and the encrypted information may then be routed to the desired control system 100.

Referring now to FIG. 9, to encrypt the requested information, the AI module 102 or other suitable module may perform the method 160 described herein. That is, in certain embodiments, at block 162, the AI module 102 may retrieve a local security-validation model stored on a local memory or storage accessible to the AI module 102. The security-validation model may be a model or algorithm that receives an input signal and produces another signal that may be used as an encryption signal for data communicated by the AI module 102.

At block 164, the AI module 102 may produce a random signal using a random signal generator or other suitable device. The random signal may be a waveform or a collection of values over time. In some embodiments, the random signal may be suitable to interface or be applied to data communicated by the AI module 102. For example, the random signal may be a string of ones and zeros. The string may be incorporated or applied to a model, such that the model uses the random signal to output a different signal.

At block 166, the AI module 102 may apply the random signal to the local security-validation model retrieved at block 162. As such, the local security-validation model may output a signal that distorts or changes the random signal according to a respective algorithm or process associated with the local security-validation model.

The output signal from the local security-validation model may be an encryption signal used to encrypt data communicated from the AI module 102. At block 168, the AI module 102 may inject or incorporate the encryption signal into the requested information determined at block 144 of FIG. 8. The AI module 102 may inject the encryption signal into the requested information in a number of ways. For instance, the AI module 102 may use an embedding component or algorithm that may include one bit of the encryption signal in between each bit of the requested information. In any case, the AI module 102 may incorporate the encryption signal into the requested information to generated encrypted information that may be transmitted to another component at block 170. In addition, at block 170, the AI module 102 may also output the random signal generated by the AI module 102 at block 164 to enable a receiving device to decrypt the encrypted information.

Keeping this in mind, FIG. 10 illustrates a method 180 for decrypting the encrypted information determined via the method 160 of FIG. 9. At block 182, the receiving component, such as the control/monitoring device 54, the routing system 112, or other suitable receiving device, may receive the encrypted information along with the random signal generated at block 164.

At block 184, the control/monitoring device 54, for example, may apply the random signal to its locally stored security-validation model. That is, the control/monitoring device 54 may have access to a security-validation model that is the same as the security-validation model stored locally on the AI module 102. In certain embodiments, during initialization of the control system 100, one of the installed modules may transmit the security-validation model to each of the other modules communicatively coupled to the data backplane 106. Alternatively, during manufacturing, each module of the local control system 42 may be programmed to include the same security-validation model to perform the tasks described herein.

By applying the received random signal to the locally stored security-validation model, the control/monitoring device 54 may determine an encryption signal that is the same as the encryption signal determined at block 166 of FIG. 9. At block 186, the control/monitoring device 54 may use the encryption signal as a decryption signal or key to decrypt the encrypted information received at block 182. For instance, the control/monitoring device 54 may be aware of the injection protocol, process, or algorithm that the AI module 102 used at block 168 and may perform an alternate process or scheme to determine the requested information based on the encryption signal.

In some embodiments, the control/monitoring device 54 may receive just the encrypted information from the AI module 102. In this case, using just the locally stored security-validation model and the encrypted information, the control/monitoring device 54 may determine the encrypted signal applied to the requested information and the corresponding requested information. That is, the security-validation model may be backwards compatible to receive the encrypted information as an input and may output the requested information and the encryption signal.

With the foregoing in mind, in some embodiments, each component or module of the local control system 42 may include a signature signal embedded in the payload of the requested information, at a header portion of the requested information, or the like. That is, when receiving data, different components or modules of the control system 100 or various receiving devices of the industrial automation system 10 may check to determine whether an expected signature signal is present in the communicated data before attempting to read or decrypt the data. In some embodiments, the signature signal may be extracted from a known portion of the received data and applied to the security-validation model or other suitable model. The model may receive the signature signal and may produce an output indicative of whether the received data is to be trusted. As such, a number of signature signals may cause the model to output a valid status. With this in mind, a number of signature signals may be locally stored with respect to the AI module 102, the control/monitoring device 54, or the like and may be embedded or added to the data being communicated.

Regardless of the security protocol undertaken between communicating devices or modules, the encryption of data in the local network (e.g., computing device, edge device, control system) may enable the data to be transmitted and stored to a cloud-computing system (e.g., Factory Talk Cloud), while limiting the vulnerability of the stored data from being intercepted or compromised by unwanted users. Moreover, the present embodiments presented herein may enable locally connected modules to communicate between each other while reducing the risk of the data communications being intercepted or compromised. In addition, the local analysis of the request for information may enable the industrial automation equipment 56 to adjust its operation more efficiently without relying on data being transmitted outside of the local control system 42.

Automated Locally Modeling of a Target Variable

With the foregoing in mind, the AI module 102 or other suitable programs may be used to assist a user in identifying efficient operating parameters for the industrial automation equipment 56 in the industrial automation system 10. In certain embodiments, the AI module 102 may receive user input (e.g., subject matter expert) to assist learning algorithms employed by AI module 102 to identify solutions to problems (e.g., requests for information) that may be defined by another user. For example, U.S. patent application Ser. No. 15/720,582, which is incorporated herein by reference, may use candidate variable inputs, which have been filtered by human operators, to identify decision variables to assist a user in operating various components of the industrial automation system. That is, the candidate variable inputs may characterize certain input data as possible influencers to the problem statement or request for information.

To effectively perform a driverless (e.g., unsupervised, without the presence of a human in the workflow of the learning) learning algorithm, the AI module 102 may analyze data that may be available to AI module 102 via the local control system 42 to identify a subset of the data that may be causally related to the operation of a particular automation device 20, industrial automation application 64, or output of the industrial automation system 10 without receiving human input. With this in mind, in some embodiments, the AI module 102 may perform certain methods to assist a user to control industrial automation devices 20 of the industrial automation system 10 without the involvement of other human operators (e.g., subject matter experts) that may traditionally be relied on to evaluate the performance or integrity of the industrial automation system 10.

As such, in certain embodiments, the AI module 102 may receive a user-defined target variable that corresponds to a variable or aspect of the industrial automation system 10 that the user is attempting to control. For example, the target variable may include a prediction of a volume output of the industrial automation application 64. The AI module 102 may then receive a number of data tags that may correspond to different types of data accessible to the AI module 102, which may be communicatively coupled to the local control system 42 that locally controls the operation of a portion or the entire industrial automation system 10.

The data tags are received and interpreted by the AI module without judgment or weight, such that the AI module 102 performs an agnostic analysis of the received data. Based on the received data, data tags, and the target variable, the AI module 102 may begin identifying a subset of the received data as input variables that affect the target output. The subset of the received data may then be used to model the target variable, thereby efficiently using the data that is more likely to be causally connected to the target variable. As such, unlike neural networks that continuously receive data from all available data sources, the AI module 102 systematically selects (e.g., through a mixed integer nonlinear optimization) a limited subset of data that is available via the local control system 42 to characterize or model the performance of target variable with respect to the limited set of data.

In one embodiment, the systematic selection process may include an explicit mixed integer optimization that penalizes the number of selected input variables to encourage parsimony of the model. Parsimony may be a feature of the automated local modeling approach disclosed herein, as it facilitates the interpretability of the model by plant operation.

Keeping the foregoing in mind, to perform the automated modeling operations described herein, the AI module 102 may employ a systematic methodology to determine whether a minimal number of available variables (e.g., data points, datasets) sufficient to build a model are available. It is well known by those skilled in the art of modeling that the more input variables are selected the smaller the prediction error could become. However, to enable the AI module 102 to perform the modeling operations described herein on data available to the local control system 42 in real time or near real time (e.g., within second of acquiring or receiving) in a manner that the resulting models are suitable for use in real-time (e.g., to pin point or identify the cause of an impending anomaly), the AI module 102 may not be able to rely on large number (e.g., more than a threshold) of inputs. That is, as the local control system 42 receives streaming data (e.g., as data is received), the model created by AI module 102 is expected to be robust to noise and disturbance inherent in real time data, and a large number of inputs for the model may adversely impact the ability of the AI module 102 to stay robust. Accordingly, the AI module 102 may seek a balance between the model accuracy, the generalization capability, and the robustness of the model that is built.

In addition, to build a model based on the streaming data, the AI module 102 may be able to modify the selection of input variables when the operation condition changes significantly (e.g., more than a threshold percentage). The change in the input subset selection, however, may be self-driven for the automated modeling paradigm to be viable. A self-driven (e.g., automated) modeling therefore may contain the ability to distinguish between the circumstances that (a) a simple re-parameterization of the selected model would be sufficient (in which case the variable selection and the functional form of the model remains unchanged and constant coefficients in the model are retrained), (b) when variable selection is still valid but the functional form is no longer suitable (e.g., when output becomes inversely proportional to an input instead of being linearly proportional to that same variable under a previous operating condition), and (c) when a new set of input variables is warranted for selection. In each case, the self-driven AI modeling engine of the AI module 102 may carefully balance the interpretability of the models for the operators/domain experts against model accuracy and sensitivity to noise/disturbance variables. The self-driven gradual escalation of the changes to the model thereby enables the real-time usability of the models, and is therefore a key distinction of the self-driven (e.g., automated) modeling engine from the state of the art. As such, the AI module 102 may account for another trade-off in the modeling, where the change in variable selection is traded off against model quality, model robustness, and the number of the variables selected by the AI module 102 for automated modeling.

In certain embodiments, the AI module 102 may create new data that describes a relationship between some dataset and the target variable. The new data may be available for view via the display 86, provided to the control/monitoring device 54 to implement a particular control scheme or strategy, used to indicate a set point for the control/monitoring device 54, used to implement quality control objectives, and the like. In any case, the AI module 102 may be employed to identify certain variables or data points that may be used to control a target variable, identify certain variables or data points that influence a target variable, and the like. By using the certain variables or data points to characterize or model the target variable, the AI module 102 may not rely on historical data sampled more than a threshold (e.g., month) of amount of time ago to perform its modeling operations. Instead, the AI module 102 may use recently sampled data (e.g., in the extreme case the streaming data) to create and verify its model. For example, if a sensor input is sampled every 30 minutes, the AI module 102 may use a collection of the sampled data to perform its modeling operations and use the most recently sampled data to verify its model.

Keeping the foregoing in mind, FIG. 11 illustrates a flow chart of a method for identifying target variables for the AI module 102 to model. As mentioned above, the AI module 102 may identify the target variables to model with limited or no human input to facilitate the automatic identification of target variables to model. The AI module 102 may generally identify target variables to model based on identifying the variables or data points that affect the operational state of the industrial automation device 20, the industrial automation equipment 56, the industrial automation system 10, or the like.

Although the following description of the method 200 is described as being performed by the AI module 102, it should be noted that any suitably programmed device with machine-learning code and algorithms stored therein may perform the embodiments described herein. Moreover, it should be noted that the method 200 may be performed in any suitable order and should not be limited to the order presented.

Referring now to FIG. 11, at block 202, the AI module 102 may receive an indication (e.g., desired target variable) of the industrial automation device 20, the industrial automation equipment 56, or portion of the industrial automation system 10 to model. The AI module 102 may be associated with the indication received at block 202 and may have access to data via the data backplane 106, adjacent modules of the respective local control system 42, or the like. The AI module 102 may rely on the data locally available to it or via the data backplane 106 to efficiently perform the embodiments described herein.

At block 204, the AI module 102 may receive data and corresponding data tags from various data sources accessible to the AI module 102 via the data backplane 106. As such, the AI module 102 may receive data from adjacent modules, local storage components, industrial automation equipment 56 communicatively coupled to a module of the local control system 42, and the like. The data tags may characterize a type of data that corresponds to a respective piece of data. However, it should be noted that the AI module 102 may merely receive the data tags and may not place any weight or judgment on the respective data based on the corresponding data tags. In this way, the AI module 102 may analyze the received data in an unbiased manner without including preconceived or assumed relationships between two datasets. For example, the AI module 102 may receive voltage data and temperature data, but for analysis purposes, the AI module 102 may just receive raw values for the voltage data and the temperature data and disregard the fact that the raw data corresponds to voltage and temperature. In this way, the AI module 102 may not attempt to characterize the voltage data as being related to the temperature data unless the AI module 102 identifies a relationship between these two datasets without regard to their context.

At block 206, the AI module 102 may perform a non-contextual or unbiased clustering of the received data. That is, the AI module 102 may apply efficient clustering algorithms (e.g., for stream clustering) to the unlabeled data (e.g., data without data tag context) to create insight into operational data of the industrial automation device 20, the industrial automation equipment 56, or the portion of the industrial automation system 10 specified at block 202.

At block 208, the AI module 102 may receive data available to the corresponding local control system 42 to determine changes in the operation state of the respective industrial automation device 20, the respective industrial automation equipment 56, or the respective portion of the industrial automation system 10 that are associated with distinct clusters of the unlabeled data in the data (e.g., real-time data acquired via sensors 16, generated by modules, etc.) received by the AI module 102. For example, FIG. 12 illustrates a multi-dimensional graph 220 that has five identified clusters based on streaming data received by the AI module 102. As mentioned above, the streaming data may correspond to data representative of real time or near real time data (e.g., acquired or generated within seconds).

Referring briefly to FIG. 12, different data points may be plotted on the multi-dimensional graph 220 via mapping to an information space that may not directly correspond to any of the measured data (e.g., a space formed by most principal or highly influential components of the measured data). As such, each dimension of the multi-dimensional graph 220 does not directly map to a physical measurement. Instead, each data point received by the AI module 102 is mapped into a new information space, where the answer to the requested information may be provided most clearly. In certain embodiments, the multi-dimensional graph 220 may be presented via the display 86, such that operation personnel may provide input with regard to labels for the identified clusters. The AI module 102, in some embodiments, may store the input label (along with any action deemed appropriate by the personnel) as an evolving "expert system" that captures operator'/domain-expert's knowhow in a systematic manner.

With this in mind, in some embodiments, when a new data point is received that does not fit in a previously identified cluster, the AI module 102 may produce an alarm for the operator to evaluate the new data point. The operator may then provide context or information related to the new data point to assist the AI module 102 to continue to classify received data points. It should be noted that the clustering of data points performed by the AI module 102 is performed without any context related to the received data. As such, the output of the clustering step could act as an input to the automated modeling engine to convey the change in the operation state of the control system and hence allow a more accurate modeling of the process where the right model will be built for each of the substantially different operating regimes of the process (control/automation system) without human input. As a result, the AI module 102 may improve its ability to determine and analyze operational parameters of the industrial automation system under diverse operating conditions that the industrial automation system 10 or portions there of experiences without the assistance of subject matter experts. The input from subject matter experts when available, however, can be incorporated into the clustering and modeling exercise (e.g., as constraints in a constrained optimization used for clustering or modeling).

Referring back to block 208, the AI module 102 may associate operational state data for the respective industrial automation device 20, the respective industrial automation equipment 56, or the respective portion of the industrial automation system 10 with each distinct cluster identified at block 206. The operational state data may be received at block 204 or may be associated with a time in which the corresponding data was acquired. For instance, the AI module 102 may compare the data points of cluster 222 in the multi-dimensional graph 220 to the corresponding operational state data for the respective industrial automation device 20, the respective industrial automation equipment 56, or the respective portion of the industrial automation system 10. If a threshold number of the data points in the cluster 222 correspond to the respective operational device operating at a temperature above a threshold, the AI module 102 may classify the cluster 222 as a high temperature operation cluster.

At block 210, the AI module 102 determine one or more models of the operational states of the respective industrial automation device 20, the respective industrial automation equipment 56, or the respective portion of the industrial automation system 10 based on relationships between the clusters and the operational states. That is, based on the self-identified clusters, the AI module 102 may train itself to model or characterize the operational parameters of the respective industrial automation device 20, the respective industrial automation equipment 56, or the respective portion of the industrial automation system 10. For instance, the AI module 102 may receive a new data point that may not fit into an existing cluster. If the data point is a first occurrence, the AI module 102 may ignore the data point as an outlier. However, if a similar data point occurs again at a later time, the AI module 102 may begin a process to create a new cluster and associate the new cluster with a new operating parameter or condition. The relationship between the data points in the cluster and the associated operational state may be used to determine respective model for the operational state that varies according to the data points. For example, if a certain subset of available process/automation system variables are found to determine the creation of a specific cluster, the AI module 102 may now retrieve the corresponding data tags of the data points to provide discernable or clear variables that a user may observe to determine the behavior of the model.

At block 212, the AI module 102 may identify one or more data points (e.g., target variables) that may affect the operation of the respective industrial automation device 20, the respective industrial automation equipment 56, or the respective portion of the industrial automation system 10 more than other data points. These data points or the subset of data points in a particular cluster or a group of clusters may be determined based on the unbiased analysis of the data points and the relationships between the data points within the respective cluster. For example, the outcome of an AI engine for clustering can be used to select certain data points that determine significant (e.g., more than a threshold) changes in the system's operating condition, and, as such, designate them as target variables for an automated causality modeling by the AI module 102 for automated modeling. As used herein, the AI engine may include one or more software applications or hardware components that perform the embodiments described herein within the AI module 102 or other suitable computing device.

In some embodiments, the AI module 102 may solve an optimization problem with regard to pruning the data points available to the AI module 102 to identify a smaller (and manageable) subset of data points that influence data points and designate these data points as target variables. For example, FIG. 13 includes a flow chart of a method 230 for identifying the target variables of a particular cluster of data points.

Referring to FIG. 13, at block 232, the AI module 102 may receive multiple data points as potential target variables. The multiple data points may correspond to each data point of an identified cluster, as described above. At block 234, the AI module 102 may model the behavior of each target variable based on an unbiased analysis of each data point and the relationship between each data point in the cluster.

Based on the analysis of block 234, the AI module 102 may generate a directed graph where each data point is represented as a node at block 263. By way of example, FIG. 14 illustrates an example directed graph 250 that includes five data points ($x_1$-$x_5$). The unbiased analysis of block 234 may determine whether a relationship exists between one or more of the data points. Based on the identified relationship, the AI module 102 may determine one or more directed links between the nodes. The directed links may be represented by the arrows that point from an originating node to a destination node. The originating nodes may correspond to the target variables that were modeled by the AI module 102 at block 232.

Since the AI module 102 models a number of data points or target variables in parallel, a number of loops may be generated in the directed graph 250. For example, data point $x_1$ includes a directed link 252 to data point $x_3$, data point $x_3$ includes a directed link 254 to data point $x_3$, and data point $x_2$ includes a directed link 256 back to data point $x_1$. Since each of these data points relate to each other in a loop, there may not be a significant relationship between these data points.

With this in mind, at block 238, the AI module 102 may prune the directed graph 250. In one embodiment, the AI module 102 may solve a properly formulated optimization problem to break the existing loops in the web generated by the directed graph 250. A potential objective function is to minimize the increase in overall prediction accuracy and the number of the links being cut in order to eliminate the loops in the web.

In one embodiment, the AI module 102 may employ a pruning algorithm that focus on eliminating links that are less likely to be indicative of a variable that affects the operation of the respective industrial automation device 20, the respective industrial automation equipment 56, or the respective portion of the industrial automation system 10. One potential criterion in the pruning stage is to remove all the links between two nodes where the link is the only connection between the nodes. For example, since data point x5 has just one directed link 258 connected between it and data point x3, the AI module 102 may remove the directed link 258. In addition, the AI module may remove directed links in which the correlation between the behaviors of the data points at the respective nodes exceeds a threshold (e.g. 95%). The node(s) for which there is no links after this pruning stage can be removed from the network as there is another variable that perfectly captures its impact on the rest of the network.

With the foregoing pruning operation described above, the AI module 102 may prune the directed graph 250 of FIG. 14 to the pruned directed graph 270 of FIG. 15. As shown in FIG. 15, after the directed links 252, 254, 256, 258, and 260 were removed due to being part of a loop or being the single link between two nodes, the remaining nodes includes data points $x_1$, $x_2$, and $x_4$. At block 240, the AI module 102 may select these target variables to perform iterative modeling. As such, the AI module 102 may continue to perform modeling operations on the selected data points based on newly received data to verify the accuracy of the models and to fine tune the model. The models of the selected target variables may then be used to control the operations of the respective industrial automation device 20, the respective industrial automation equipment 56, or the respective portion of the industrial automation system 10 communicatively coupled to the AI module 102. In this way, the AI module 102 may automatically choose variables to model to efficiently control the operations of the respective industrial automation device 20, the respective industrial automation equipment 56, or the respective portion of the industrial automation system 10. The presently disclosed embodiments is of particular value in large systems where the sheer number of tags makes a domain expert's job to identify a variable of significance as the target for the automated modeling engine extremely difficult. The above-mentioned methodology will use the information content of the measured data as the basis for the identification of potentially critical variables in the operation.

Following the pruning stage, the AI module 102 may highlight or present a variable with larger number of incoming links as a potential variable of interest to the experts. In other words, the AI module 102 may identify the key convergence points of data as target variables for the automated modeling engine. The modeling AI module 102 may then be adjusted to optimize or model these target variables as mentioned above.

Based on the processes described above, the AI module 102 may be employed to analyze the quality of the performance of the industrial automation system, determine a root cause for a particular problem or output of the industrial automation system, provide prediction outputs for soft sensing capabilities, and the like in an entirely self-driven manner. In one embodiment, upon the occurrence of a noteworthy event (e.g., a stoppage in a production line, a breakdown of an equipment, or a failure of the product quality test), the discovery function of the self-driven AI engine of the AI module 102 may be activated first. In the course of this discovery process a number of nodes may be identified as candidate target variables with potential relevance to the observed event. Each of the candidate nodes may then be sent to the self-modeling function of the AI engine in the AI module 102 where in the manner described earlier a minimal subset of the process variables may be selected to model the candidate nodes. The predicted value of the candidate node may then be analyzed (e.g., via clustering function of the AI engine) to determine whether a change in predictability of the candidate target variable could provide an advance notice for the impending event. A notification may be sent to the domain expert via the AI module 102 and the feedback from the said expert may be used to designate the candidate node as a target variable to be monitored into the future. Example applications for the AI module 102 include minimizing fuel consumption for various operations, predicting when product quality will be less than a threshold for a particular batch, predict whether manufactured goods will pass stress tests, determine emission levels in real time, monitor pumps and other equipment for anomalies, and the like.

Visualizing Relationships Between Target Variables

As discussed above with respect to block 240 of FIG. 13, in certain embodiments, the AI module 102 may repeatedly analyze the received datasets to glean additional information regarding the target variables during each iteration. For example, the early iterations of analysis may involve self-learning (e.g., identifying relationships) between the data points (e.g., target variables), while the later iterations of analysis may involve identifying a statistical feature of the identified relationship or strength of correlation between the related data points. In addition to the strength of correlation between data points, the AI module 102 may identify a directionality for the relationship, as illustrated in the directed graph 250. In one embodiment, the AI module 102 may be equipped with an auto-excitation functionality that (a) monitors the normal operation of the automation process to establish a level of signal that is sufficient for the AI engine to interrogate directionality of impact but is not large enough to disrupt normal operation of the industrial automation system 10. That is, as discussed above, the AI module 102 may determine which data point may affect the performance or output of another data point. By analyzing the data points provided to the AI module 102 in this manner, the AI module 102 may provide better context for determining relationship information between different operations of different components (e.g., devices, equipment, portions) of the industrial automation system.

In one embodiment, the strength of the relationship between two data points may be represented by adjusting a visual characteristic or property (e.g., thickness, pattern) of the line between the two points. In addition, the directionality of the relationship may also be depicted via an arrow in the line as depicted in the directed links of the directed graph 250 in FIG. 14. Such visual representation of the automation process can be used for performance monitoring if the directed graph 250 is updated in real-time based on current operation data. For example, if a correlation or connection between two nodes falls below a threshold (in the extreme case disappears), then the AI module 102 may generate an alarm accordingly.

With the foregoing in mind, FIG. 16 illustrates another example directed graph 280 that may be generated by the AI module 102 that depicts the relationship between data points using a line, a strength of the relationship using a thickness of a line, and a directionality of the relationship using an arrow disposed on the line. Although the relationship, strength, and directionality is visualized in FIG. 16 using a line, a thickness, and an arrow, it should be noted that other visual effects may be used to visualize the respective properties.

Referring to FIG. 16, directed link 282 between data points $x_6$ and $x_7$ and directed link 284 between data points $x_7$ and $x_9$ may indicate that the same strength of correlation exists because the weight or thickness of the directed links 284 and 286 are substantially similar. The directed link 286 between data points $x_8$ and $x_7$, however, is thicker than the directed links 282 and 284, thereby indicating that the directed link 286 has a stronger strength of correlation.

The arrows depicted on each directed link may be representative of a directionality of influence or effect between the data points. That is, the arrow of directed link 286 pointing from data point $x_8$ to data point $x_7$ indicates that the data point $x_8$ influences or causes a change to data point $x_7$.

It should be noted that since the AI module 102 does not apply weights, denote data tags, provide metadata, or the like to the data points, the AI module 102 agnostically (e.g., unbiased) analyzes the data points regardless of what the data points represent. In this way, the AI module 102 is free from bias that may normally occur from human analyzers that may tend to influence the human analyzers' decision.

In some embodiments, after the AI module 102 generates the directed graph, the AI module 102 may present the directed graph via the display 86 or other suitable device. As such, an operator may view and interpret the directed graph with the data points and the relationship information pertaining thereto. In this way, the operator may adjust the operations of certain components in the industrial automation system 10 based on the relationships between the various data points—not based on his traditional understanding. It should be noted that the unit-less presentation of data points provides the operator with a nontraditional perspective of the operation of the respective modeled data points. As such, the operator may be free from natural biases or previous experiences affecting his judgment or analysis.

For example, in a water treatment plant, an operator may control the operations of various processes involved in treating water received from various sources. Operators may believe that because they control the processes for the water treatment, they are responsible or directly attributable to the quality of the water treatment. However, the AI module 102 may perform an analysis of the data points and determine that water originating from a particular location or a machine that is used prior to the operations managed by the operator may affect the quality of the water treatment more than other data points that are directly controllable by the operator. Since these operations may occur before the operator has any control over the water treatment process, the operator may not determine or suspect that the actual problem causing the water treatment quality to decrease is occurring prior to the operator's involvement or control. After identifying the most impactful data point via the directed graph described above, the AI module 102 may assign the identified data point as a target variable and generate a model that aims to control the target value with respect to improving the water quality of the water treatment plant. In some embodiments, the AI module 102 may identify a number of data points that may affect the water quality, and the AI module 102 may model these data points with respect to the water quality in accordance with the embodiments described herein.

With the foregoing in mind, FIG. 17 illustrates a flow chart of a method for automatically identifying target variables to model and determining strength of relationships between target variables, in accordance with embodiments described herein. Like the other methods described above, the method 300 may be performed in any suitable order by any suitable device.

The following description of the method 300 includes the AI module 102 performing a methodology for identifying or down selecting a group of data points that may affect another data point, determine the directionality of the effects, develop a model that characterizes the identified data points with respect to a target variable, and present a visualization that represents the relationships between the identified data points and the target variable. In some embodiments, a first engine or AI module 102 may perform the down selection of data points, a second engine or AI module 102 may determine the directionality, and a third engine or AI module 102 may perform the modeling. It should be noted that unlike the 200 of FIG. 11, the present discussion of the method 300 include one or more predefined target variables.

Referring now to FIG. 17, at block 302, the AI module 102 may receive data points from locally accessible data sources as described above. In addition, the AI module 102 may receive one or more target variables that the AI module 102 may model or identify relationships between the received data points and the target variables.

At block 304, the AI module 102 may map the received data points to an informational space, similar to the multi-dimensional graph 220 of FIG. 12. In one embodiment, the AI module 102 may employ a Principal Component Analysis (PCA) methodology to map the data points to the informational space. The PCA methodology may involve extracting information content of the data points. For example, the AI module 102 may employ the PCA techniques to determine directions of maximal variation in the information content of the data points. As such, the AI module 102 may reduce the dimensionality of data analysis by mapping the received data points into an information space, where redundant information or data points will project onto a single representative feature.

At block 306, the AI module 102 may reduce redundancies in the mapped data points. That is, in one embodiment, the AI module 102 may employ a recursive PCA operation to eliminate the redundancy in the raw data points and use PCA components as candidate input variables for the modeling the target variables received at block 302. The PCA components may be an output of the PCA process based on a set of observations of possibly correlated variables (e.g., data points) into a set of values of linearly uncorrelated variables called principal components.

By employing the recursive PCA process, the AI module 102 may increase a speed in which parallel-modeling processes can be employed. For example, the AI module 102 may treat each data point (at the extreme case) as a target variable for parallel modeling using one AI module, a number of AI module 102, or other suitable devices.

Using the results of the recursive PCA process, at block 308, the AI module 102 may identify relationships or links between the PCA components, the data points, and the target variables. At block 310, the AI module 102 may perform an efficient pruning exercise where each of the target variables that share identical PCA components as input nodes are analyzed to determine whether the target variables are redundant. That is, the AI module 102 may determine that target variables that have similar input variables and similar functional dependencies are likely redundant identical information content. In this case, the AI module 102 may keep one target variable from each group. In addition, the AI module may identify one or more target variables with large number of links (e.g., more than a threshold). In one embodiment, the AI module 102 may characterize these target variables as target variable of interest, which may be reported to the operator for potential monitoring, automated monitoring by the control/monitoring device 54, assigned by the AI module 102 as a target variable for automated modeling engine to be modeled as a function of available original data points where redundancy in the original variable space is removed, and the like.

After the relationships are pruned, the AI module 102 may, at block 312, generate a model of the target variables received at block 302 based on the pruned relationships. At block 314, the AI module 102 may determine the strength of the relationships between data points and the modeled target variables based on the generated model. That is, after the model for the target variables is built, the AI module 102 may employ many strategies to determine the significance or strength of any link between an input node and the target variable that is modeled. By way of example, the AI module 102 may employ model-based metrics (e.g., Sum of Squared Errors (SSE) or Percent Variance Explained), data-based metrics (e.g., Linear Correlation Coefficient, Distance Correlation Coefficient, and Maximal Information Coefficient), or the like. In one embodiment, the AI module 102 may systematically remove a source node from a given model and observe the deterioration in prediction capability of the model. The link whose removal results in the largest deterioration of prediction capability may be designated by the AI module 102 as the strongest link, and thus, in one embodiment, displayed with thickest width in the corresponding directed graph. In some embodiments, the above-described process may be referred to as an automated influence analysis.

With the foregoing in mind, the AI module 102 may use the generated model and the corresponding strengths of relationships to detect causality or a root cause of a condition that is affecting the performance of a target variable. Generally, the detection of causality is a computationally expensive exercise. In many cases, the prediction quality is the sole objective of the modeling exercise, and, as such, the exact causal relationship is not of primary interest. However, in model-based root cause analysis applications, the notion of causality is of primary interest. In some embodiments, most techniques for "causal inference" in time series data fall into two broad categories: (1) those related to transfer entropy; and (2) those related to Granger causality. Transfer entropy and Granger causality are known to be equivalent under certain conditions. In some embodiments, the AI module 102 may also incorporate a casual inference technique, called Convergent Cross-Mapping (CCM), is to analyze causality for time series in non-separable dynamic systems. It should be noted that the CCM algorithm may be computationally expensive for the AI module 102 to implement. As such, the AI module 102 may use the output of the influence analysis by the self-driving modeling engine in the AI module 102 to reduce the computational complexity of the CCM algorithm via reducing the number of the paired candidate variables to be tested for causality. The filtering applied by the influence analysis may thus be very useful when potential number of variables is greater than some threshold.

In one embodiment, the AI module 102 may employ the CCM algorithm as an independent process whenever an identified model (e.g., that includes a node as target variable, one or more nodes as input variables, links indicating the connection between input and target variables, and functional form describing how target variable is modeled as a function of input variables) is flagged by the operator or the AI module 102 for "causality analysis." In this case, the AI module 102 may trace the cause or strongest contributing component or data point of a particular condition to one or more data points.

Referring back to the method 300 of FIG. 17, as the AI module 102 generates values for various target variables, it may also generate a visualization to present the different states the target variables will assume in an information space similar to the multi-dimensional graph 220 of FIG. 12. For example, the target variable values for different operational scenarios may be mapped into an information space and plotted on a chart and may be classified by the AI module or a user as a particular operating parameter or condition. Referring briefly to FIG. 12, the multi-dimensional graph 220 includes a 3-dimensional information space where a potentially large number of measured target variables are mapped to clearly indicate various states a system assumes as it is simulated for various conditions or parameters.

By way of example, in the multi-dimensional graph 220, cluster 222 may be classified as an operating parameter when wiring temperature is above some threshold, cluster 224 may be classified as excessive vibration, cluster 226 may be classified as excessive power consumption, and the like. In some embodiments, the AI module 102 may plot the target variable values and determine likely classifications for each cluster or receive a user input that classifies each cluster.

In some embodiments, the target variable values may be plotted in information space that may allow a user to visualize operating points or different operating conditions of the industrial automation system 10. To plot the target variables in the information space, the AI module 102 may align the raw data from various sources according to a sequence that corresponds to a time in which the data was acquired. The sequential data may then be provided to the AI module 102 without time stamps, such that the AI module 102 may analyze data sets together without knowledge of their time stamps.

Keeping this in mind, FIG. 18 illustrates a method 320 for plotting data points in informational space. Like the other methods described above, the method 320 may be performed in any suitable order by any suitable device.

At block 322, the AI module 102 may receive target variable datasets over time. At block 324, the AI module 102 may align the target variable datasets according to a sequence that corresponds to the time in which the datasets were received. As mentioned above, to plot the target variable datasets in the information space, the AI module 102 may align the raw data from various sources according to a sequence that corresponds to a time in which the data was acquired. For instance, FIG. 19 illustrates a sample graph of position, torque, and velocity values aligned with respect to sequence.

As shown in FIG. 19, certain collections of values may be characterized with respect to different ranges (e.g., Ranges 0-4). Each range may correspond to a particular condition or operational state of a respective industrial automation device 20, a respective industrial automation equipment 56, or a respective portion of the industrial automation system 10. That is, the AI module 102 may determine that Range 0 values correspond to a condition when the wiring temperature is above some threshold.

At block 326, the AI module 102 may group the target variable datasets according to the detected ranges or sequences. At block 328, the AI module 102 may analyze the grouped target variable datasets according to conditions or operational states of a respective industrial automation device 20, a respective industrial automation equipment 56, or a respective portion of the industrial automation system 10 that is locally accessible or associated with the AI module 102. In one embodiment, the target variable values for each sample in each range may correspond to a different operating parameter of a corresponding machine.

After analyzing the grouped target datasets, the AI module 102 may, at block 330, plot the target variable values an information space with respect to each range, as depicted in FIG. 20. In some embodiments, the visualizations generated by the AI module 102 may enable the AI module 102 or a user to better identify various situations or conditions that may be present in the industrial automation system. In addition, certain features, such as a drop-down feature, may be added to the visualization to allow a user to better interact with the visualization. For example, the drop-down feature may include an option to send raw data or related to regarding a selected data point or cluster to an expert. In another example, the user interactive feature of the visualization may allow the user to reclassify certain data points, designate certain data points that are not currently classified as part of a particular cluster, narrow the data points used for a particular cluster, and the like. In addition, the AI module 102 may alter the depiction of certain clusters or data points to provide an indication to an operator regarding an upcoming operational parameter, condition, or the like.

As shown in FIGS. 12 and 20, the target variable datasets may be grouped in a three-dimensional space or two-dimensional space, respectively. In one embodiment, the AI module 102 may provide the ability for a user to select the information space to which the raw data is mapped based on the user's goal/objective. For example, a two-dimensional view might be preferred by operators, as opposed to a three-dimensional view. Referring back to FIG. 12, in some embodiments, the AI module 102 may map the three-dimensional plots to the two-dimensional space (e.g., dim 1 and dim2 of FIG. 12). In this way, cluster 222 and cluster 228 may become indistinguishable. In contrast, while mapping to another two-dimensional space (e.g., dim1 and dim3 of FIG. 12), the AI module 102 may provide a maximal separation of the cluster 222 and the cluster 228. By presenting the clustered data to a user in a format that may be useful for the user to discern, the AI module 102 may enable operators to adjust operations in the respective industrial automation device 20, the respective industrial automation equipment 56, or the respective portion of the industrial automation system 10 more efficiently.

Additionally, by employing the methods 300 and 320 and other methods described above, the AI module 102 may send an alert or signal to the display 86 to notify an operator or the control/monitoring device 54 to adjust operations to avoid problems, increase efficiency, or the like. For example, the signal may indicate that a product being produced by the industrial automation system has a quality that is less than some threshold since the current target datasets are mapped in the informational space corresponding to the quality issue. In addition, the AI module 102 may provide a recommendation with regard to a change in the operation of the industrial automation system to correct the detected problem. For instance, the AI module 102 may recommend to use a higher temperature for a certain portion of a process, stop the high-speed production of a product, or the like based on its analysis of the condition. Alternatively, the AI module 102 may work to identify the root cause of the problem based on the data points.

Industrial Control Based on Modeled Target Variables

In certain embodiments, the AI module 102 may identify a target variable to model to address a concern or control another target variable or data point according to a specified condition. To model the target variable, the AI module 102 may use the available data to determine an expected measurement for the target variable with respect to time and expected conditions. In addition to modeling the target variable, a problem statement or operational condition may be defined for the model target variable. For example, a user may specify that the target variable should remain within a particular range of values. The AI module 102 may generate a visualization that represents various operating points of the industrial automation system 10 or portions thereof, a particular industrial automation device 20, or the like. In this way, each data point may be tagged, categorized, or clustered according to a corresponding operation point.

By way of example, referring back to the example control system 100 of FIG. 5, the data backplane 106 of a local control system 42 may include a control/monitoring device 54, the I/O module 104, and the AI module 102. In certain embodiments, the control system may receive a number of definitions or tags for different variables that an operator may wish to control. These variables (e.g., target variables) may or may not be directly related to a parameter or measurement that may be acquired by a sensor or the like. In some cases, the target variable may not be associated with a predictable behavior due to the complex interworking and interdependencies between components of the industrial automation system. As such, the AI module 102 may model the target variable based on the available data and simulated data.

In certain embodiments, the AI module 102 or other suitable component (e.g., control/monitoring device 54) may receive a number of definitions or tags for different variables that an operator may wish to control. These variables (e.g., target variables) may or may not be directly related to a parameter or measurement that may be available to the local control system 42. In some cases, the target variable may not be associated with a predictable behavior due to the complex interworking and interdependencies between components of the industrial automation system 10. As such, the AI module 102 may model the target variable based on the available data and simulated data.

To perform these operations, the AI module 102 may receive data points xi-moo $x_{100}$ and characterize each data point $x_n$ as a particular variable type. For example, variable type 1 may indicate that the data point is the target variable for modeling, variable type 0 may indicate that the AI module 102 should evaluate the data point as a potential variable that affects the target variable, variable type −1 indicates that the AI module 102 should not consider this data point (e.g., data point is unrelated to the target variable), and variable type −2 may indicate that the data point is a categorical variable. The categorical variable may provide an indication with regard to a category or product attributed to the data point. For example, if one data point is attributed to three different products produced in the industrial automation system 10, the AI module 102 may use this insight to determine how the data point affects different data points when operating to produce different products. By receiving the data points and systematically defining a variable type for each data point, the AI module 102 may initially generate a random network of data points, and then prune the network to focus on the data points that affect other data points as discussed above.

In certain instances, the AI module 102 may initially ignore data points that affect a number of other variables. For example, when modeling a performance of a chiller, the AI module 102 may receive data points related to the airflow, temperature, change in temperature, pressure, and humidity. Humidity, however, may affect each of the other data points, such that the AI module 102 may not be able to gain any insight into the interworking or interdependencies between the data points due to the strong correlation between humidity and the other data points. As such, the AI module 102 may initially ignore the data points associated with the humidity and determine the interdependencies without the humidity data. However, when determining the model of the chiller, the AI module 102 may then reintroduce the humidity data.

It should be noted that the AI module 102 is able to produce robust models of the industrial automation system 10 in a self-driven manner by taking advantage of non-random relationship governing the operation of the industrial automation system 10 or a portion thereof. In one embodiment, the AI module 102 may target one or more data points for modeling (e.g., the target variables can be determined by a human operator/plant manager/data scientist and alike), and identify a subset of available process data as inputs for a model for the target variable(s). The deterministic nature of the physical industrial automation system may enable the AI module 102 to capture a functional dependency between input process variables and the one or more targets through self-learning that may remain valid even when the inputs to the physical process are noisy or subject to unknown disturbances. As such, the AI module 102 may analyze the data points with regard to the data points operating in a predictable nature with respect to the operation of the industrial automation system 10 or portions thereof. The predictable nature may thus be characterized by a variety of functions that are auto-discovered by the AI module 102 (e.g., through a systematic mixed integer non-linear optimization) that corresponds to a logical effectual relationship between data points.

With the foregoing in mind, an example for controlling a motor (e.g., industrial automation device 20 or equipment 56) is provided blow. In one embodiment, a motor may be coupled to the I/O module 104 of the data backplane 106. The I/O module 104 may receive data (e.g., torque, position, velocity data) from sensors 16 disposed on the motor and make the data available to the AI module 102. If a user requests that a particular target variable $x_1$ is monitored, the AI module 102 may begin collecting available data via the I/O module 104 and other data sources and begin to plot the target variable in a chart (e.g., 2-dimensional or 3-dimensional) with respect to different operating parameters for different components of the industrial automation system 10 or portions thereof In some embodiments, the AI module 102 may label the modeled variable (e.g., Aware_$X_1$) for the target variable $x_1$ according to the parameters of FIG. 21 with a pre-defined naming protocol that will automatically prompt another AI module (or a different executable on the same AI Module 102) to action. For example, an AI module responsible for the tuning of a proportional-integral-derivative (PID) controller in the industrial automation system 10 may periodically scan the data backplane 106 and deploy a text-processing functionality to decode the variable name Aware_$X_1$ as the soft-sensor value to be used by the control system 100 or the local control system 42.

The incorporation of a common vocabulary for the AI engines deployed at the industrial automation layer may enable self-configuration and self-maintenance in a large application throughout the entire manufacturing enterprise. In one embodiment, this common vocabulary may be shared by a machine learning solution that is deployed at a server level or in the cloud-based computing system 68. In particular, the routing system 112 in FIG. 6 could serve as the coordinator of the communication between industrial automation system 10 and the cloud-based computing system 68 allowing independence (and simplifying communication challenges) for various AI engines deployed throughout the enterprise (e.g., communication network 110).

As shown in FIG. 21, the parameters may include a simulated value for the target variable $\widehat{x_1}$, a minimum value, a maximum value, and a variable type to categorize the target variable $\widehat{x_1}$. It should be noted that the parameters may include additional components (e.g., average value) or fewer components as depicted in FIG. 21. The AI module 102 may use the data type to identify different data points accessible to the AI module 102 to model the target variable $\widehat{x_1}$. It should be noted that the parameters may include a problem statement that the AI module 102 is designated to solve for the target variable $\widehat{x_1}$. The problem statement may also be defined as a function or the like. For example, the function may include minimizing a difference between the target variable $\widehat{x_1}$ and the measured variable $x_1$, according to Equation 1.

$$mm[\widehat{x_1} - x_1^{measured}]^2 \tag{1}$$

In certain embodiments, the AI module 102 may work to control the certain variables or data points that are designated with a variable type 0, which indicates an effectual relationship for the performance of the target variable $\widehat{x_1}$. For example, to solve the function defined in Equation 1, the AI module 102 may determine a best fit function for the variables or data points that are designated with a variable type 0 (e.g., $f(x_2, x_3, x_4)$).

In any case, based on the model generated by the AI module 102, the AI module 102 may determine adjustment operations for the motor or other related components to control the target variable $\widehat{x_1}$ with respect to the defined parameters. As such, the AI module 102 may send the adjustment operations to the control/monitoring device 54 to implement, thereby causing the operation of the industrial automation system 10 or a portion thereof to change.

By employing the AI module 102 in this fashion, the AI module 102 may optimize the target variable $\widehat{x_1}$ by controlling the operation of various components that affect the performance of target variable $\widehat{x_1}$. The control aspects may occur in real time and may include anticipated changes in the target variable $\widehat{x_1}$ based on the performance of other parameters. In this way, the AI module 102 may enable the industrial automation system 10 or a portion thereof to operate more efficiently, while avoiding potential issues based on the predicted model of various target variables.

With the foregoing in mind, the presently disclosed embodiments may enable the AI module 102 to automatically build a model without the presence of a human expert in the work flow of the modeling, as described above. In addition to modeling a function or target variable, the AI module may perform efficient analysis to determine operational functions or algorithms that may be used to operate the industrial automation equipment 56 more efficiently or solve a requested problem or condition statement more effectively.

By way of example, FIG. 22 illustrates a flow chart of a method 360 for controlling the operations of an industrial automation device 20, the industrial automation equipment 56, the industrial automation system 10, a portion of the industrial automation system 10, or the like using the modeling operations and a more accurate operational function. Like the methods described above, the method 360 may be performed by any suitable computing device in any suitable order.

Referring now to FIG. 22, at block 362, the AI module 102 may receive a target variable that has been designated for modeling. The target variable may be identified via user input or via automatic identification processes described herein. In one example, the target variable may include an increase in the "cost of control" (e.g. increase in tracking error for one or more variables being controlled, or increase in the objective function in a model predictive control formulation that may include the cost of movement of the manipulated variables).

At block 364, the AI module 102 may receive parameters for the target variable. The parameters may include the components described above with respect to FIG. 21. As such, the parameters may include condition statements (e.g., minimum value, maximum value), an operational function, or the like. At block 366, the AI module 102 may identify data points that influence the target variable with respect to the parameters received at block 362 based on the embodiments described above. Continuing the example described above, an automated modeling engine of the AI module 102 identifies which process variable(s) contribute to the increase in the "cost of control."

At block 368, the AI module 102 may model the data points identified at block 366. The modeled data points may be designated as new target variables to control the target variable defined at block 362. Referring again to the example above, the AI module 102 may, at block 368, automatically build a model of the variable(s) found to be the cause of the increase in the "cost of control." In some embodiments, these new target variables may be referred to as root cause variables.

At block 370, the AI module 102 may determine a new function or adjust the function defined in the parameters received at block 364 to control the target variable received at block 362 based on the model generated at block 368. Continuing with the example presented herein, the AI module 102 may adjust or augment the original objective function for control with appropriate terms aimed at minimizing the variation in the root cause variable(s). In some embodiments, the AI module 102 performs a root-cause analysis using automated modeling procedures described earlier.

At block 372, the AI module 102 may adjust the operations of the respective industrial automation device 20, the respective industrial automation equipment 56, and the respective industrial automation system 10 based on the updated or new function determined at block 370. That is, the AI module 102 may employ this as an adaptive strategy to improve the functional or conditional parameters used to control a particular device based on the ability of the AI module 102 to perform automated modeling with minimal or no reliance on a human expert. It should be noted that by employing the embodiments described herein that AI module 102 may have the ability to manage the entire workflow (e.g., from assessing that a certain improvement in a given target variable needs to happen to meet the pre-defined operation targets, to identifying what variables can be manipulated to impact that said target variable, to determining how the identified set of variables relate to the target variable, to proposing an adjustment to the manipulated variables). Additionally, the AI module 102 may determine messages, destinations for the messages (e.g., operation roles/personnel the decisions/results), a method for communication, and the like.

Triggering the Retraining of Model Target Variables

In certain embodiments, the AI module 102 may be tasked with modeling a target variable that corresponds to data acquired by a sensor. For example, data point $x_1$ may correspond to the target variable $\widehat{x_1}$. In this example, data point $x_1$ may have a variable type 1 assigned to it, thereby indicating to the AI module 102 that the data point $x_1$ will be modeled based on other data points (e.g., data points $x_2$ and $x_3$). Keeping this in mind, data points $x_2$ and $x_3$ may have a variable type 0 assigned to it, thereby indicating to the AI module 102 that these data points are to be used to determine the target variable $\widehat{x_1}$. An example of the measured data points $x_1$, $x_2$, and $x_3$ and the target variable $\widehat{x_1}$ is illustrated in FIG. 23.

Referring to FIG. 23, graph 380 may include sensor data for data points $x_1$, $x_2$, and $x_3$. The sensor data for data points $x_1$, $x_2$, and $x_3$ are presented as lines 382, 384, and 386, respectively. Line 388, however, tracks the value of the modeled target variable $\widehat{x_1}$. As shown in the graph 380, the line 388 follows a similar path as the line 382. However, at time $t_0$ the line 388 and the line 382 start to diverge to different values. This divergence may correspond to an error between the modeled target variable $\widehat{x_1}$ and the actual target variable data recorded as data point $x_1$.

With the foregoing in mind, in some embodiments, the AI module 102 may train a model that characterizes the behavior of the modeled target variable $\widehat{x_1}$ according to the data points $x_2$ and $x_3$. After training the model, the AI module 102 may track the error between the target variable $\widehat{x_1}$ and the measured data point $x_1$. In some embodiments, the model of the target variable $\widehat{x_1}$ may not accurately represent the measured data point $x_1$ over time. To better ensure that the AI module 102 is accurately determining the target variable $\widehat{x_1}$, the AI module 102 may monitor an error between the target variable $\widehat{x_1}$ and the measured data point $x_1$. If the error increases above some threshold, the AI module may stop calculating the target variable $\widehat{x_1}$ and retrain the target variable $\widehat{x_1}$ based on the newly acquired data points that are designated as variable type 0. When retraining the model, different coefficients and/or other variables may be used to more accurately represent the target variable $\widehat{x_1}$.

In some embodiments, the AI module 102 may employ a tiered system for retraining the model as presented in method 400 of FIG. 24. For instance, at block 402, the AI module 102 may receive data points from the I/O module 104 or other suitable device. The AI module 102 may receive the data points that correspond to the variable type 0 for a particular target variable designated for modeling. The data points may correspond to sensor data, or other At block 404, the AI module 102 may train a model for the target variable based on the data points received at block 402. In addition to receiving the data points used to train the model, at block 406, the AI module 102 may receive an additional data point from a sensor 16, such that the data point corresponds to the actual data of the modeled target variable. The additional data point(s) may be used to verify or check that the modeled target variable $\widehat{x_1}$ is accurate.

At block 408, the AI module 102 may determine whether an error between the target variable $\widehat{x_1}$ and the measured data point $x_1$ is greater than a first threshold (e.g., 5%) and less than a second threshold (e.g., 10%). If the error is within this first range of thresholds, the AI module 102 may proceed to block 410 and retrain the model using the original data points designated as variable type 0. Alternatively, the AI module 102 may proceed to block 412. It should be noted that, in some embodiments, the user may specify the thresholds to the AI module 102. Alternatively, the AI module 102 may determine the thresholds.

If the error is greater than the second threshold and less than a third threshold (e.g., 15%), the AI module 102 may proceed to block 414 and analyze the data points designated as variable type 0 to identify a new function that defines the behavior of the target variable $\widehat{x_1}$, as described above with respect to the method 360. Alternatively, the AI module 102 may proceed to block 416.

At block 416, the AI module 102 may determine if the error is greater than the third threshold (e.g., 15%). If the error is greater than the third threshold, the AI module 102 may proceed to block 418 and designate other data points as variable type 0 and identify clusters and relationships from anew. That is, the AI module 102 may receive a collection of available data points from the data backplane 106 and identify clusters and relationships between data points and the target variable $\widehat{x_1}$, as described above with reference to FIGS. 7, 11, 13, 17, and the like.

If, at block 416, the AI module 102 determines that the error is not greater than the third threshold, the AI module 102 determines that the error is less than the first threshold. In some embodiments, when the error is less than the first threshold, the AI module 102 may consider this error as an acceptable error. As such, the AI module 102 may return block 402 and continue to monitor the data points related to the target variable $\widehat{x_1}$.

By way of example, referring to the graph 380 of FIG. 23, between time t0 and time $t_1$, the error or the difference between the target variable $\widehat{x_1}$ and the corresponding sensor data or calculated data that corresponds to the actual value for the target variable $\widehat{x_1}$ may be acceptable to the AI module 102. Between time $t_1$ and time $t_2$, the AI module 102 may retrain the target variable $\widehat{x_1}$ using the existing data points used to train the model for the target variable $\widehat{x_1}$, as described above in block 410, because the error is within a first range of values.

Between time $t_1$ and time $t_2$, the AI module 102 may determine that the error is within a second range of values that correspond to identifying a new function or adjustment to the function used to generate the model of the target variable $\widehat{x_1}$, as described above with respect to block 414. In the same manner, between time $t_2$ and time $t_3$, the AI module 102 may determine that the error is greater than some value that corresponds to generating a new model based on the unbiased analysis described above with respect to block 418.

In another embodiment, the AI module 102 may use the prediction error to automatically inform the operators of the causes of the increase in prediction error. In this case, the AI module 102 may designate the monitored error as a target variable (e.g. sets the variable type for prediction error to 1), and may spawn or execute a data-driven modeling exercise to build a model of the monitored error. It is possible that the outcome of this modeling exercise will reveal process variables that are more responsible for increase in prediction error than other process variable, and therefore suggest a set of potential root-causes for human expert's review.

By employing the tiered modeling operations described above, the AI module 102 may efficiently maintain an accurate model of the target variable. That is, the AI module 102 may perform tiered retraining operations based on the discrepancy between the actual and modeled values. The tiered retraining operations may enable the AI module 102 to conserve computing resources and power when the error is relatively small. However, as the error increases, the AI module 102 may perform more rigorous or increased computations to ensure that the modeled target variable is accurate.

In another embodiment, the AI module 102 may predict the error for the modeled value based on the techniques described herein. The prediction of error can be used to provide advice on remaining useful lifetime for an asset. That is, the remaining useful lifetime is a useful input for predictive maintenance applications, and, as such, has been the subject of interest by both academia and industry. In some embodiments, determining the useful lifetime may involve: (a) an expert using an in-depth understanding of unit operation to determine how far from a failure a certain unit operation is; or (b) operation data collected over the lifetime of a unit (e.g., up to and including the failure mode) for several units of the same type and a learning algorithm is used to learn the signature of the failure (preferably enough in advance), such that the AI module 102 or the control/monitoring device 54 may be notified of an impending likelihood of failure.

By employing the techniques described in the present disclosure, the AI module 102 may enable a self-driven AI engine to use the ability to extract fundamental physical relationship from the normal operation data to establish a baseline for deciding the remaining useful lifetime. More specifically, the AI engine 102 may use the increase in modeling error as an indication of the loss of the remaining useful lifetime. This error along with the rate at which this error increase changes may offer a measure of remaining useful life for the equipment. In the absence of domain expertise to guide the AI engine to target a key physical signature of unit operation, the AI engine may use a causality analysis conducted for example as an independent process on the AI module 102 to determine the feature or target variable to be modeled automatically to determine the cause for the respective issue.

While only certain features of the embodiments described herein have been illustrated and described, many modifications and changes will occur to those skilled in the art. It is, therefore, to be understood that the appended claims are intended to cover all such modifications and changes as fall within the true spirit of the embodiments described herein.

The invention claimed is:

1. An industrial automation system, comprising:
   an automation device; and
   a control system communicatively coupled to the automation device, wherein the control system comprises a first computing circuit of a plurality of computing circuits, wherein the first computing circuit is configured to:
   receive a plurality of datasets via at least a second module of the plurality of computing circuits, wherein the plurality datasets comprise raw values without context regarding the plurality datasets;
   identify a subset of the plurality of datasets that influences a value of a target variable by analyzing the raw values without regard to the context;
   model a behavior of the target variable over time based on the subset of the plurality of datasets; and
   adjust one or more operations of the automation device based on the model.

2. The industrial automation system of claim 1, wherein the first computing circuit is configured to identify the subset of the plurality of datasets by:
   group the plurality of datasets into a plurality of clusters based on a corresponding condition or operational state of the automation device;
   determine one or more relationships between each dataset in a respective subset of the plurality of datasets in each of the plurality of clusters; and
   identify a portion of datasets in each respective subset of the plurality of datasets based on the one or more relationships.

3. The industrial automation system of claim 2, wherein the first computing circuit is configured to generated a directed graph based on the one or more relationships, wherein the directed graph is indicative of at least one directional relationship between at least two datasets of the respective subset of the plurality of datasets.

4. The industrial automation system of claim 3, wherein the at least one directional relationship is represented by an arrow.

5. The industrial automation system of claim 3, wherein the directed graph comprises a link between the at least two datasets.

6. The industrial automation system of claim 3, wherein the first computing circuit is configured to determine a strength of a relationship between the at least two datasets and alter the link based on the strength.

7. The industrial automation system of claim 6, wherein the link is altered by adjusting a thickness of a line representing the link.

8. The industrial automation system of claim 2, wherein the first computing circuit is configured to identify the portion of datasets by pruning the one or more relationships.

9. A method for operating an industrial automation system, comprising:
receiving, via a first computing circuit of a plurality of computing circuits in a control system, a plurality of datasets via at least a second module of the plurality of computing circuits, wherein the plurality datasets comprise raw values without context regarding the plurality datasets;
identifying, via the first computing circuit, a subset of the plurality of datasets that influences a value of a target variable by analyzing the data without regard to the context;
modeling, via the first computing circuit, a behavior of the target variable over time based on the subset of the plurality of datasets; and
adjusting, via the first computing circuit, one or more operations of an automation device based on the model.

10. The method of claim 9, wherein identifying the subset of the plurality of datasets comprises:
grouping the plurality of datasets into a plurality of clusters based on a corresponding condition or operational state of the automation device;
determining one or more relationships between each dataset in a respective subset of the plurality of datasets in each of the plurality of clusters; and
identifying a portion of datasets in each respective subset of the plurality of datasets based on the one or more relationships.

11. The method of claim 10, comprising generating a directed graph based on the one or more relationships, wherein the directed graph is indicative of a plurality of directional relationships between an additional plurality of datasets of the respective subset of the plurality of datasets.

12. The method of claim 11, comprising pruning the plurality of directional relationships based on one or more loops created by a portion of the plurality of directional relationships.

13. The method of claim 11, comprising pruning the plurality of directional relationships based whether one of the additional plurality of datasets comprises only one directional relationship associated therewith.

14. The method of claim 11, comprising determining a strength of a relationship between the at least two datasets and alter a weight of a link representative of the relationship based on the strength.

15. A non-transitory computer-readable medium comprising computer- executable instructions that, when executed, are configured to cause a processor to:
receive a plurality of datasets via at least a second module of a plurality of computing circuits, wherein the plurality datasets comprise raw values without context regarding the plurality datasets;
identify a subset of the plurality of datasets that influences a value of a target variable by analyzing the data without regard to the context by:
grouping the plurality of datasets into a plurality of clusters based on a corresponding condition or operational state of an automation device;
determining one or more relationships between each dataset in a respective subset of the plurality of datasets in each of the plurality of clusters; and
identifying a portion of datasets in each respective subset of the plurality of datasets based on the one or more relationships; and
generate a directed graph based on the one or more relationships, wherein the directed graph is indicative of a plurality of directional relationships between an additional plurality of datasets of the respective subset of the plurality of datasets; and
display the plurality of clusters and the directed graph via an electronic display.

16. The non-transitory computer-readable medium of claim 15, wherein the computer-executable instructions are configured to cause the processor to:
receive an input indicative of a characterization of at least one of the plurality of clusters from a user; and
model a behavior of the target variable over time based on the subset of the plurality of datasets and the input.

17. The non-transitory computer-readable medium of claim 15, wherein the computer-executable instructions are configured to cause the processor to eliminate one or more redundancies in the plurality of datasets based on a recursive Principal Component Analysis (PCA) operation.

18. The non-transitory computer-readable medium of claim 15, wherein the computer-executable instructions are configured to cause the processor to group the plurality of datasets into the plurality of clusters in an informational space based on a Principal Component Analysis (PCA) methodology.

19. The non-transitory computer-readable medium of claim 15, wherein the computer-executable instructions are configured to determine a strength of a relationship between at least two datasets and alter the link based on the strength.

20. The non-transitory computer-readable medium of claim 19, wherein the strength of the relationship is determined based on a model-based metric, a data-based metric, or both.

* * * * *